United States Patent
Uchiyama

(10) Patent No.: US 10,299,088 B2
(45) Date of Patent: May 21, 2019

(54) USER TERMINAL, RSU, METHOD AND PROGRAM

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/767,014

(22) PCT Filed: Jan. 10, 2017

(86) PCT No.: PCT/JP2017/000487
§ 371 (c)(1),
(2) Date: Apr. 9, 2018

(87) PCT Pub. No.: WO2017/134986
PCT Pub. Date: Aug. 10, 2017

(65) Prior Publication Data
US 2018/0302768 A1 Oct. 18, 2018

(30) Foreign Application Priority Data

Feb. 4, 2016 (JP) .................................. 2016-020141

(51) Int. Cl.
*H04W 24/00* (2009.01)
*H04W 4/40* (2018.01)
(Continued)

(52) U.S. Cl.
CPC .............. *H04W 4/40* (2018.02); *G08G 1/005* (2013.01); *G08G 1/163* (2013.01); *G08G 1/164* (2013.01);
(Continued)

(58) Field of Classification Search
CPC ....... H04W 4/04; H04W 72/048; H04W 4/00; H04W 4/70; H04W 24/02; H04W 4/046;
(Continued)

(56) References Cited

U.S. PATENT DOCUMENTS 9,959,763 B2 * 5/2018 Miller ....................... G08G 1/20
10,037,689 B2 * 7/2018 Taylor .................. G08G 1/0141
(Continued)

FOREIGN PATENT DOCUMENTS

JP        2011-253403 A    12/2015
WO    WO 2016/013826 A1    1/2016
(Continued)

OTHER PUBLICATIONS

JP 2011 253403 A (Advanced Telecommunication Res Inst Int; Oki Electric IND Co Ltd) Dec. 15, 2011 (Dec. 15, 2011), All pages and Figures.*

(Continued)

*Primary Examiner* — Mahendra Patel
(74) *Attorney, Agent, or Firm* — Xsensus LLP

(57) ABSTRACT

An electronic device configured to perform wireless communication in accordance with vehicle-to-X (V2X) communication, the V2X communication including at least vehicle-to-vehicle (V2V) communication, vehicle-to-infrastructure (V2I) communication, and vehicle-to-pedestrian (V2P) communication, each of the V2V, V2I and V2P communications having an intermittent communication function; receive a signal associated with a location of the electronic device; determine whether to activate or deactivate a communication parameter corresponding to the V2P communication based on the signal associated with the location of the electronic device; activate or deactivate the communication parameter corresponding to the V2P communication based on the determining; and activate the intermittent communication function for the V2P communication in a case that that the parameter corresponding to the V2P communication is activated.

21 Claims, 26 Drawing Sheets

| V | I | P | H |
|---|---|---|---|
| • Passenger vehicle<br>• Commercial or fleet vehicle<br>• Emergency vehicle<br>• Transit vehicle | • Cellular network<br>• Data centre<br>• Fleet or freight management centre<br>• Traffic management centre<br>• Weather service<br>• Rail operation centre<br>• Parking system<br>• Toll system | • Cyclist<br>• Pedestrian shelter<br>• Motorcycle | • Home network<br>• Garage<br>• Enterprise or dealer networks |

(51) Int. Cl.
*H04W 76/23* (2018.01)
*G08G 1/16* (2006.01)
*H04W 4/04* (2009.01)
*H04L 29/08* (2006.01)
*G08G 1/005* (2006.01)
*H04W 52/02* (2009.01)
*H04W 4/02* (2018.01)

(52) U.S. Cl.
CPC ............ *G08G 1/166* (2013.01); *H04L 67/12* (2013.01); *H04W 4/046* (2013.01); *H04W 52/0216* (2013.01); *H04W 52/0251* (2013.01); *H04W 52/0261* (2013.01); *H04W 76/23* (2018.02); *H04W 4/023* (2013.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/166* (2018.01); *Y02D 70/21* (2018.01); *Y02D 70/24* (2018.01); *Y02D 70/25* (2018.01)

(58) Field of Classification Search
CPC ....... H04W 48/14; H04W 4/80; H04W 72/04; H04L 67/125; G08G 1/205; G08G 1/005; G08G 1/163; H04B 1/3822
USPC .......... 455/456.3, 39, 507; 370/351; 340/1.1
See application file for complete search history.

(56) References Cited

U.S. PATENT DOCUMENTS

| 2014/0023008 | A1* | 1/2014 | Ahn | H04L 5/006 370/329 |
| 2014/0185529 | A1* | 7/2014 | Lim | H04W 8/005 370/328 |
| 2015/0334536 | A1* | 11/2015 | Suzuki | H04W 4/046 370/329 |
| 2017/0032402 | A1* | 2/2017 | Patsiokas | G06Q 30/0266 |
| 2017/0280469 | A1* | 9/2017 | Park | H04W 24/10 |
| 2018/0049104 | A1* | 2/2018 | Van Phan | H04W 76/14 |
| 2018/0063825 | A1* | 3/2018 | Van Phan | H04W 52/0216 |

FOREIGN PATENT DOCUMENTS

| WO | WO 2016013826 A1 * | 1/2016 | ............. H04W 4/00 |
| WO | WO-2016013826 A1 * | 1/2016 | ............. H04W 4/00 |

OTHER PUBLICATIONS

International Search Report dated Apr. 13, 2017 in PCT/JP2017/000487, 4 pages.

3$^{rd}$ Generation Partnership Project; Technical Specification Group Services and System Aspects; Study on LTE support for Vehicle to Everything (V2X) services (Release 14), 3GPP TR 22.885 V14.0.0, Dec. 2015, pp. 2-50 (with cover page).

* cited by examiner

[Fig. 1]
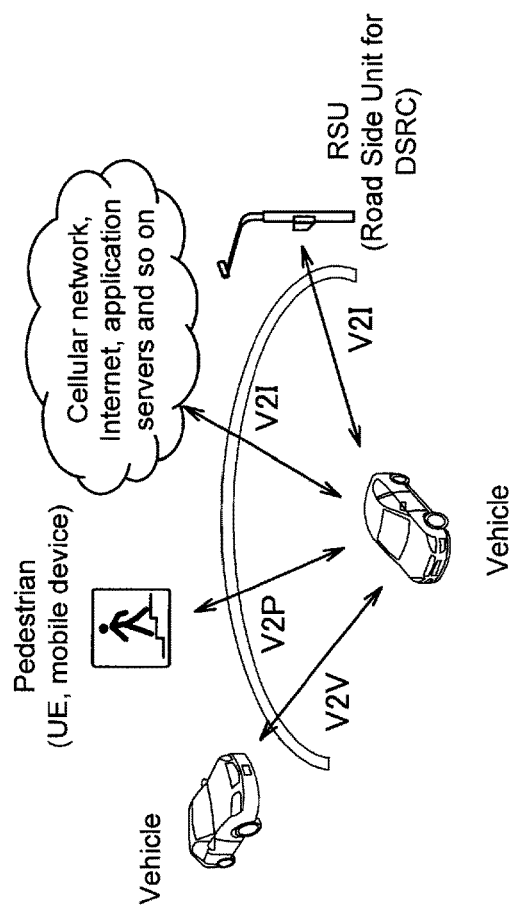

[Fig. 2]
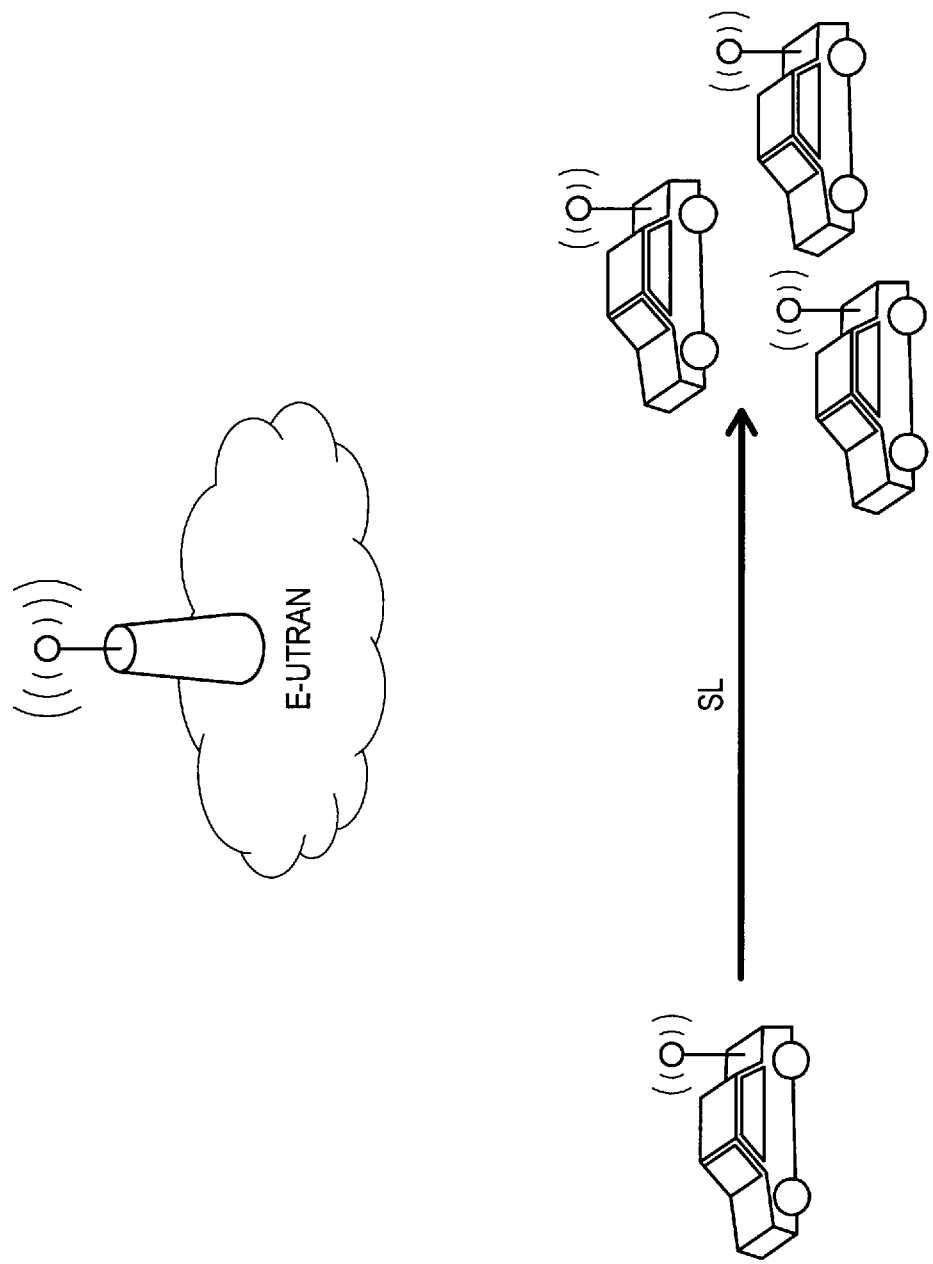

[Fig. 3]
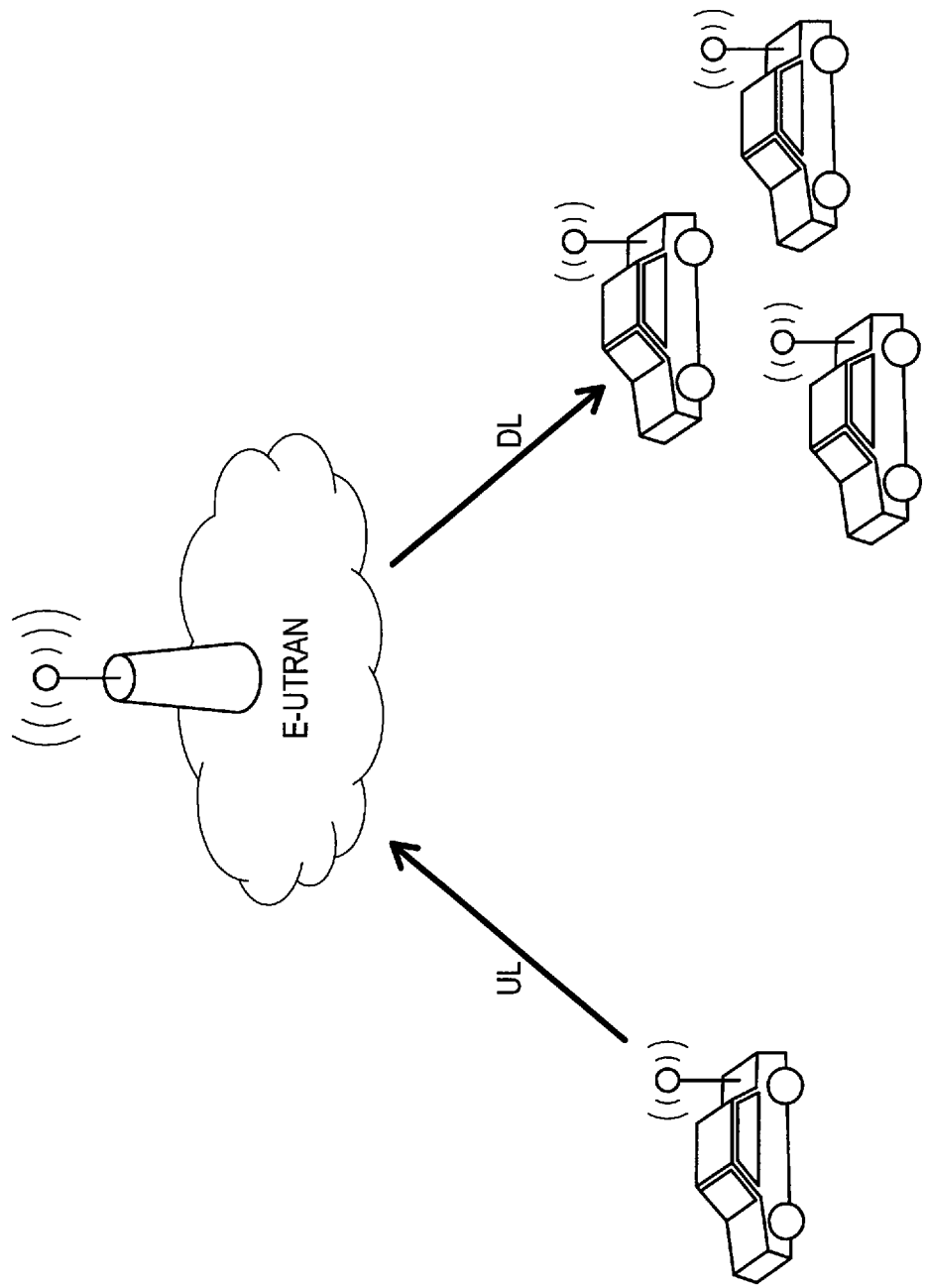

[Fig. 4]
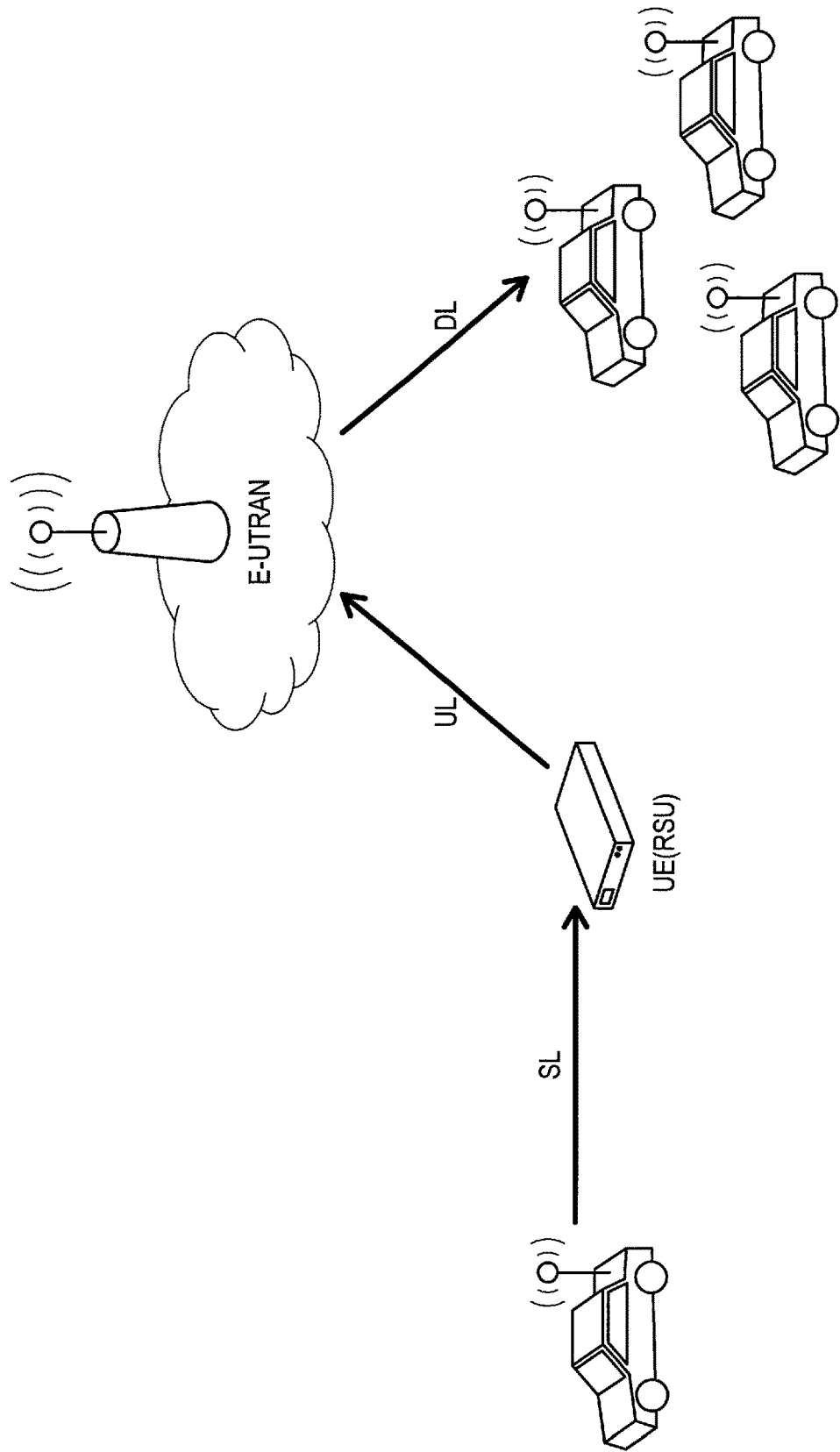

[Fig. 5]
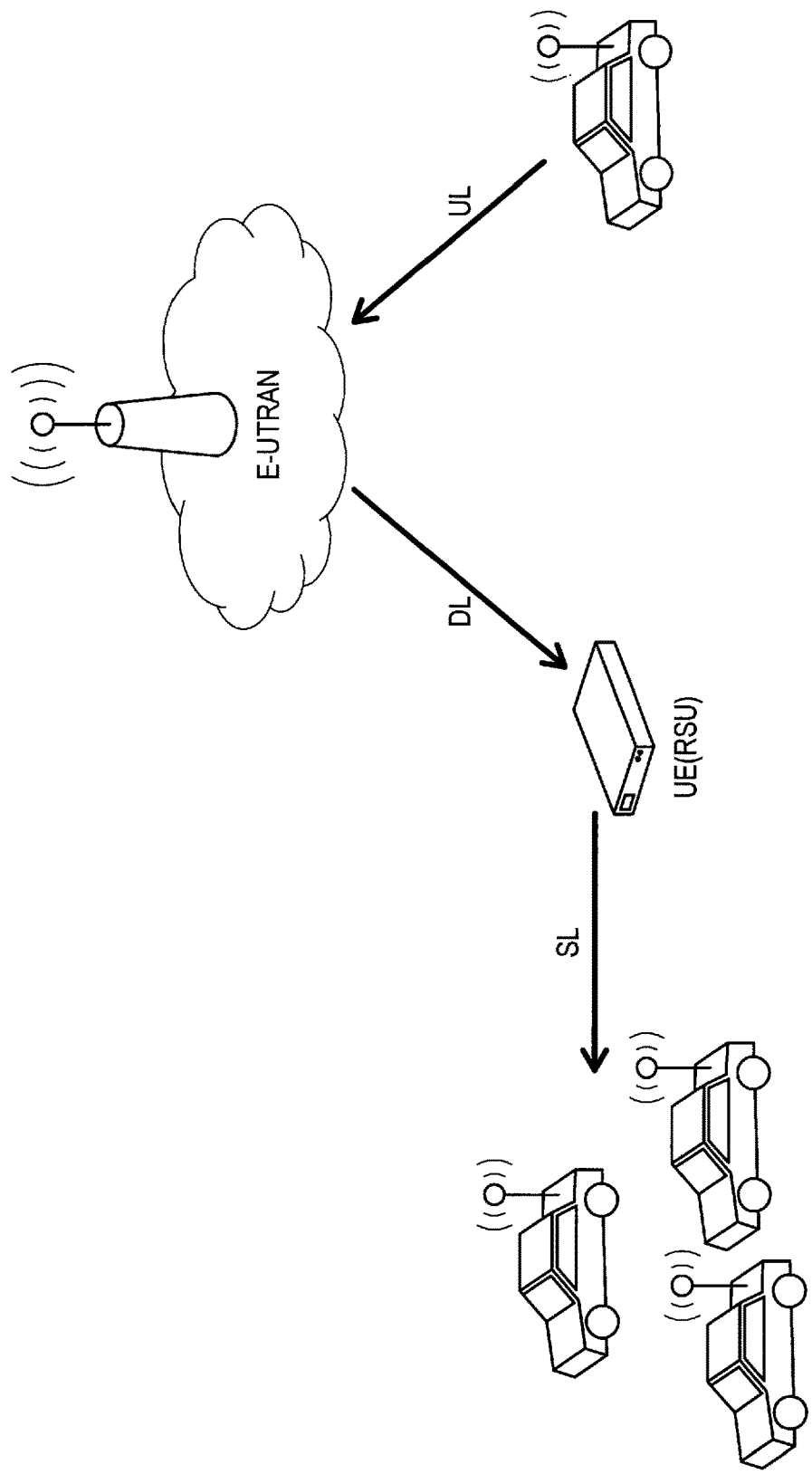

[Fig. 6]
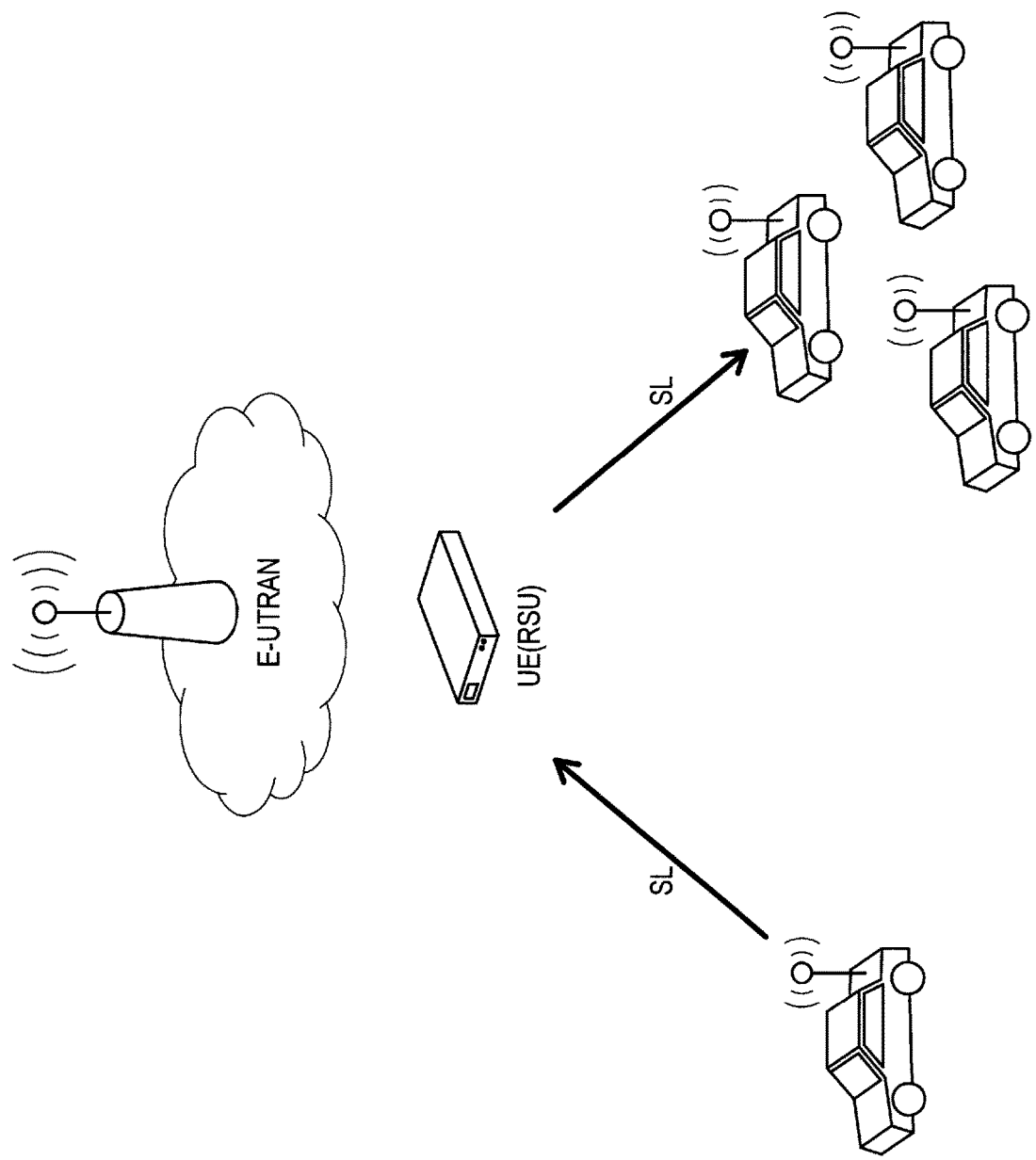

[Fig. 7]
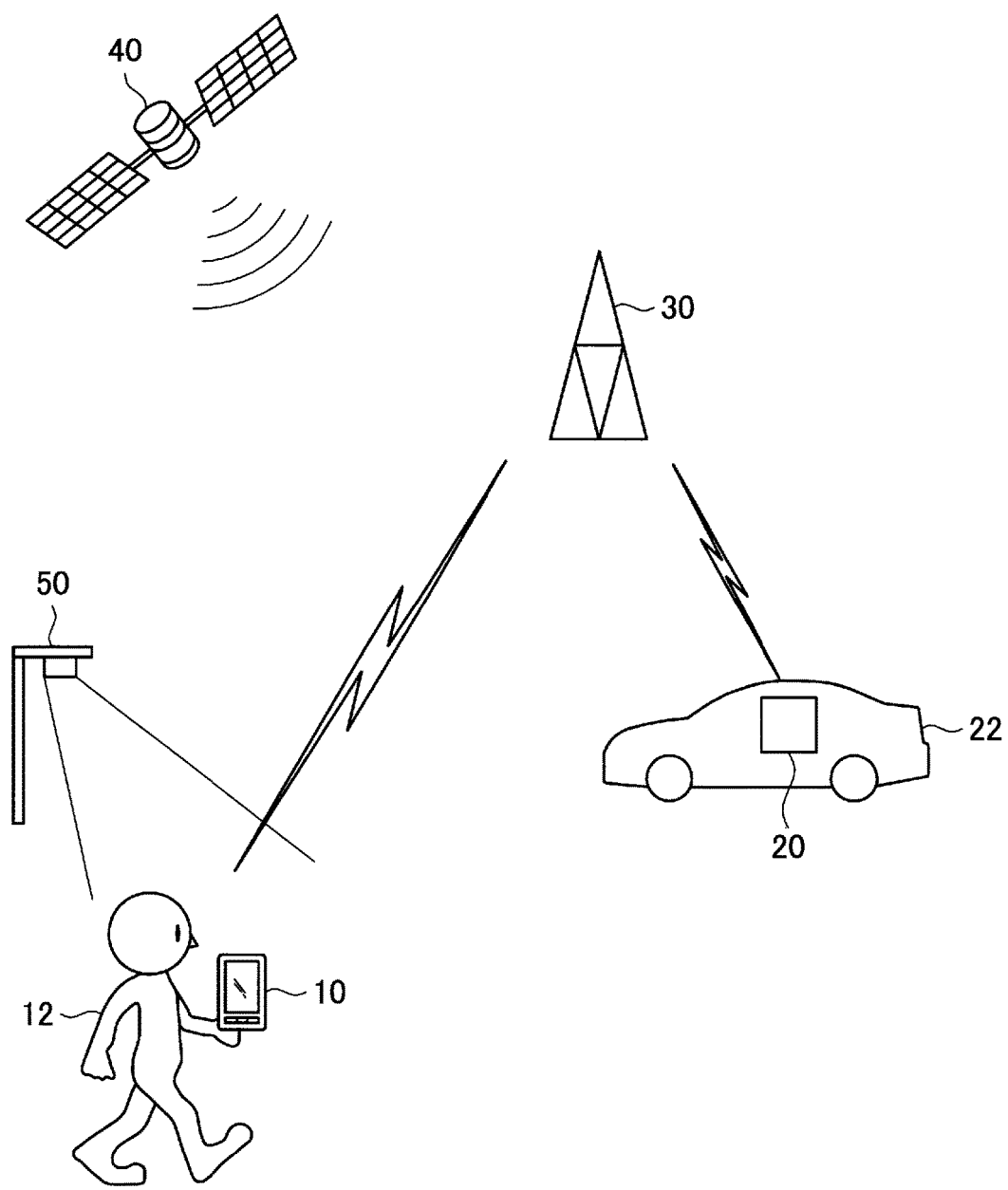

[Fig. 8]
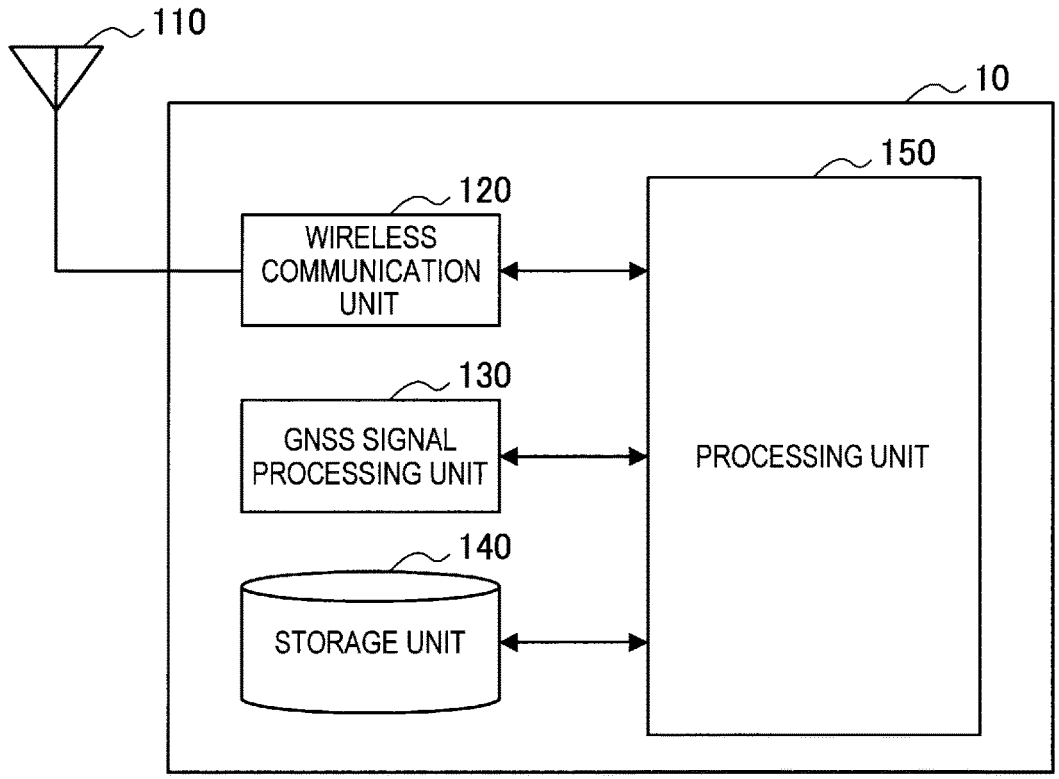
[Fig. 9]
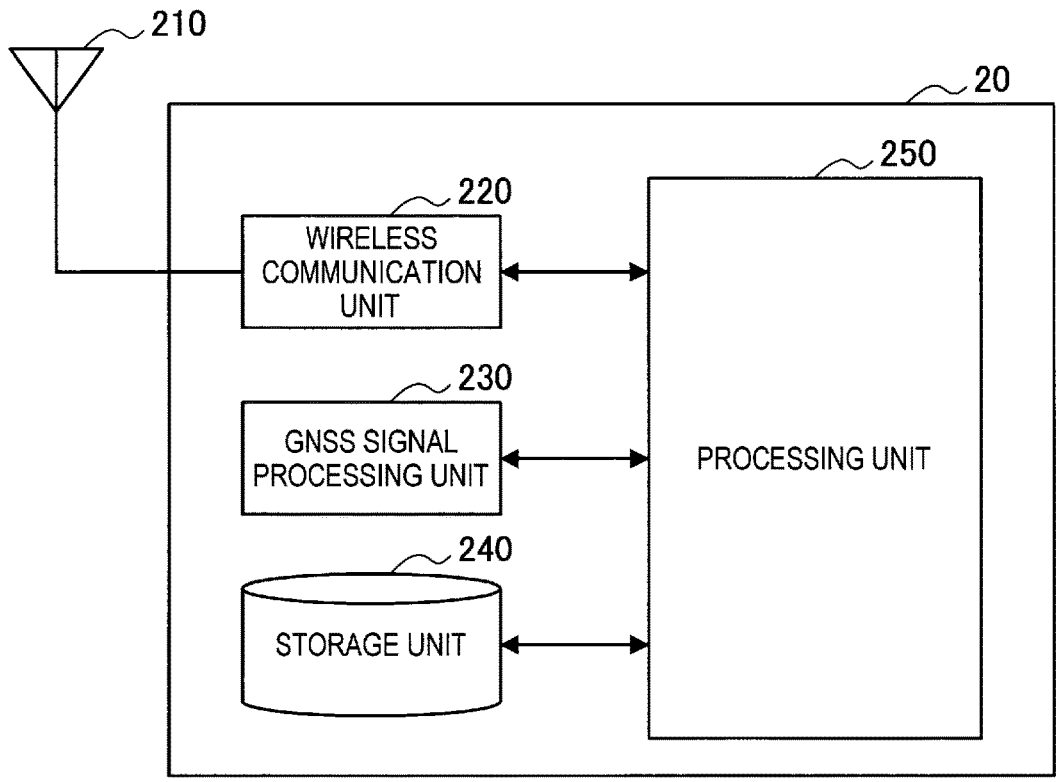

[Fig. 10]
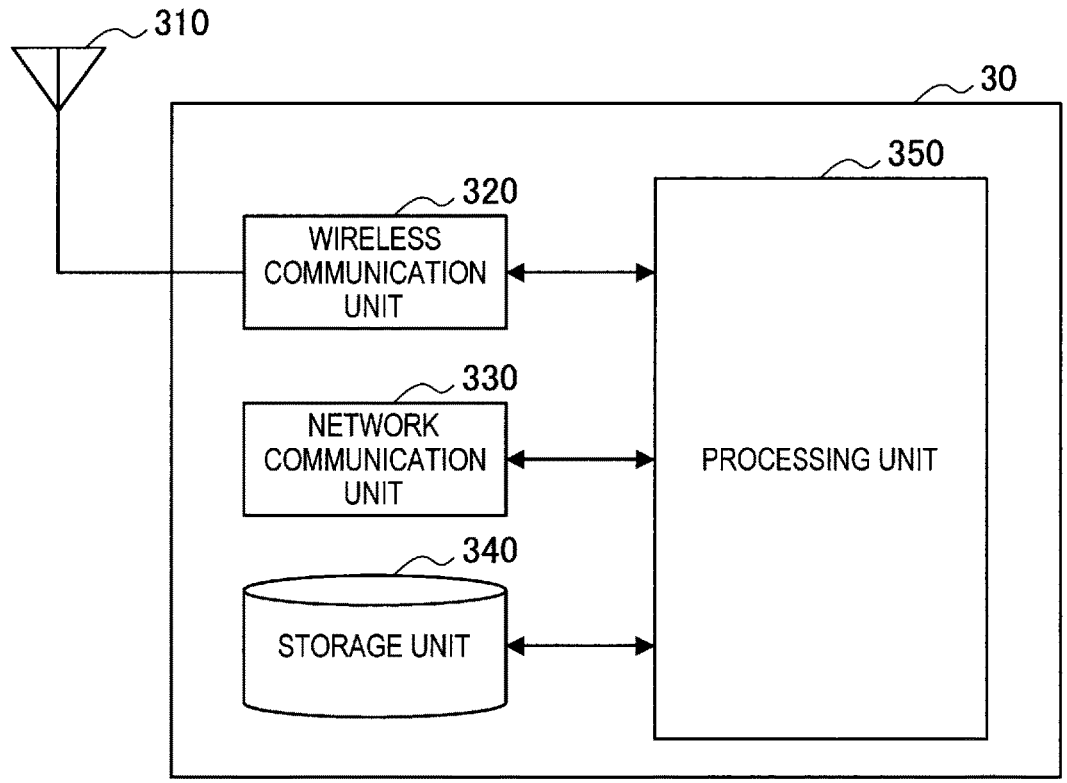
[Fig. 11]
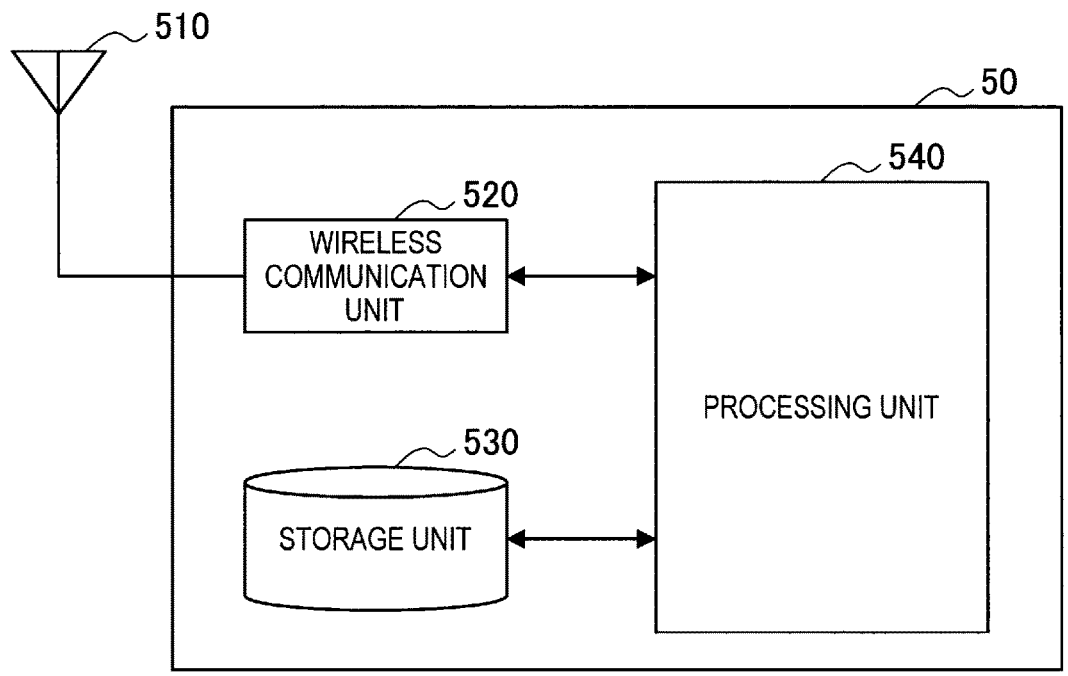

[Fig. 12]
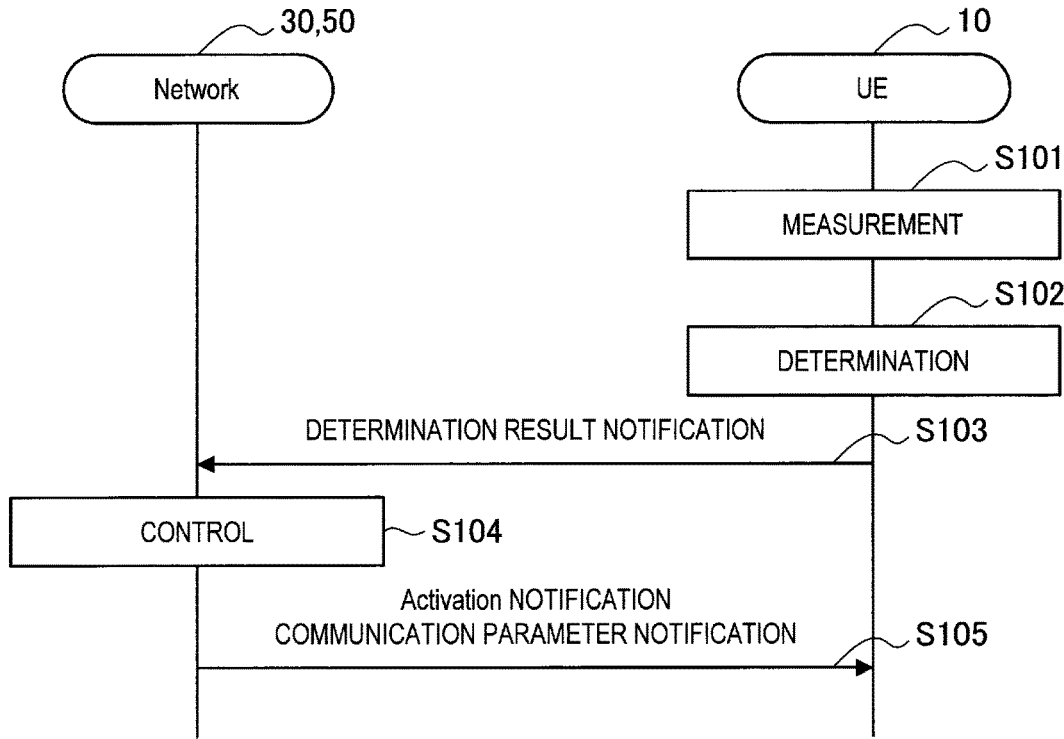
[Fig. 13]
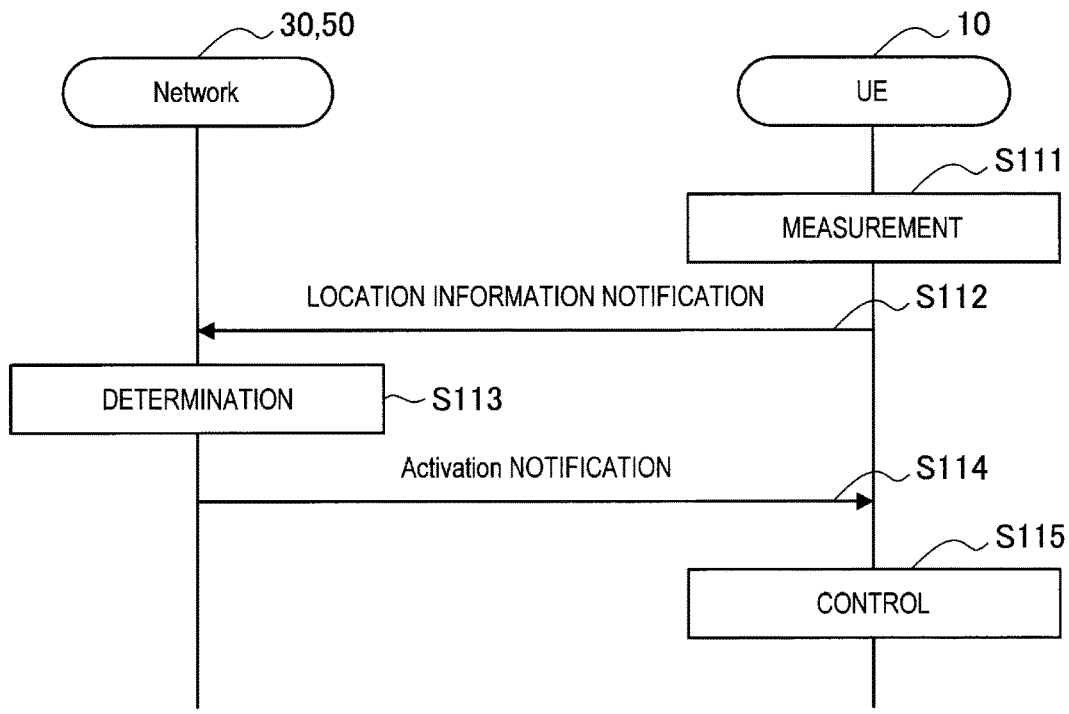

[Fig. 14]
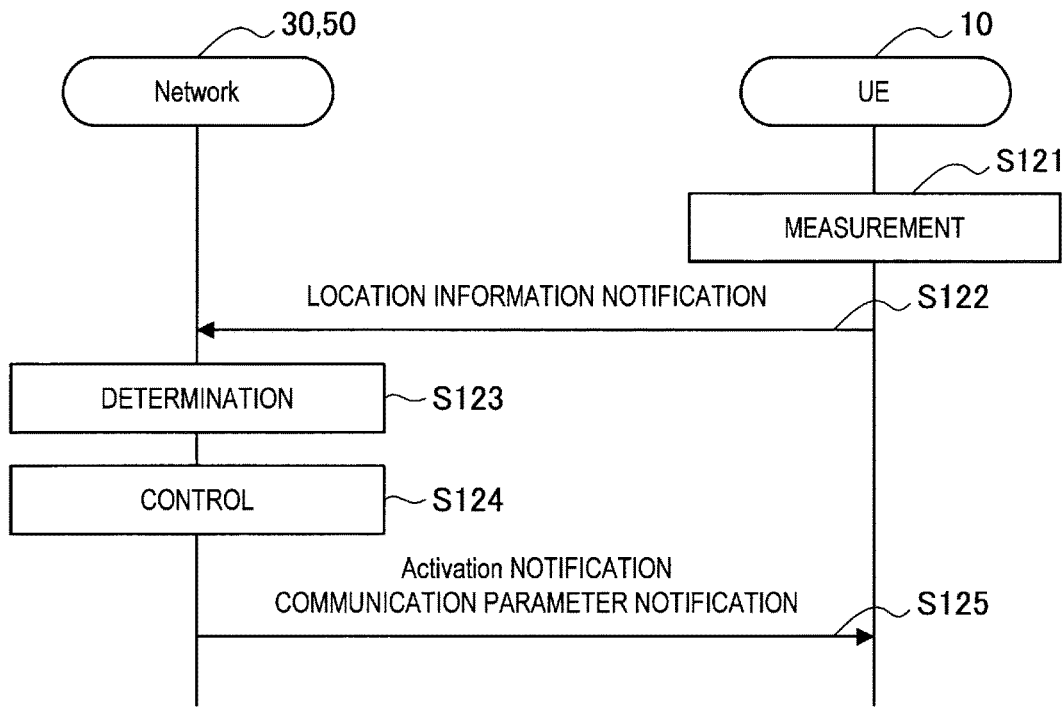
[Fig. 15]
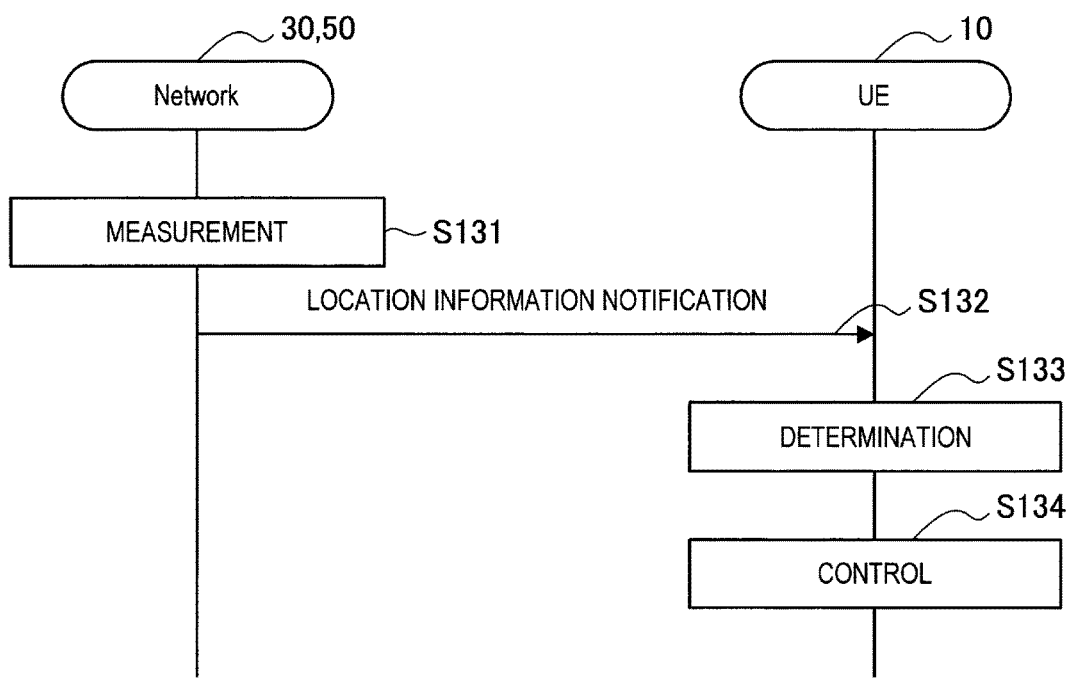

[Fig. 16]
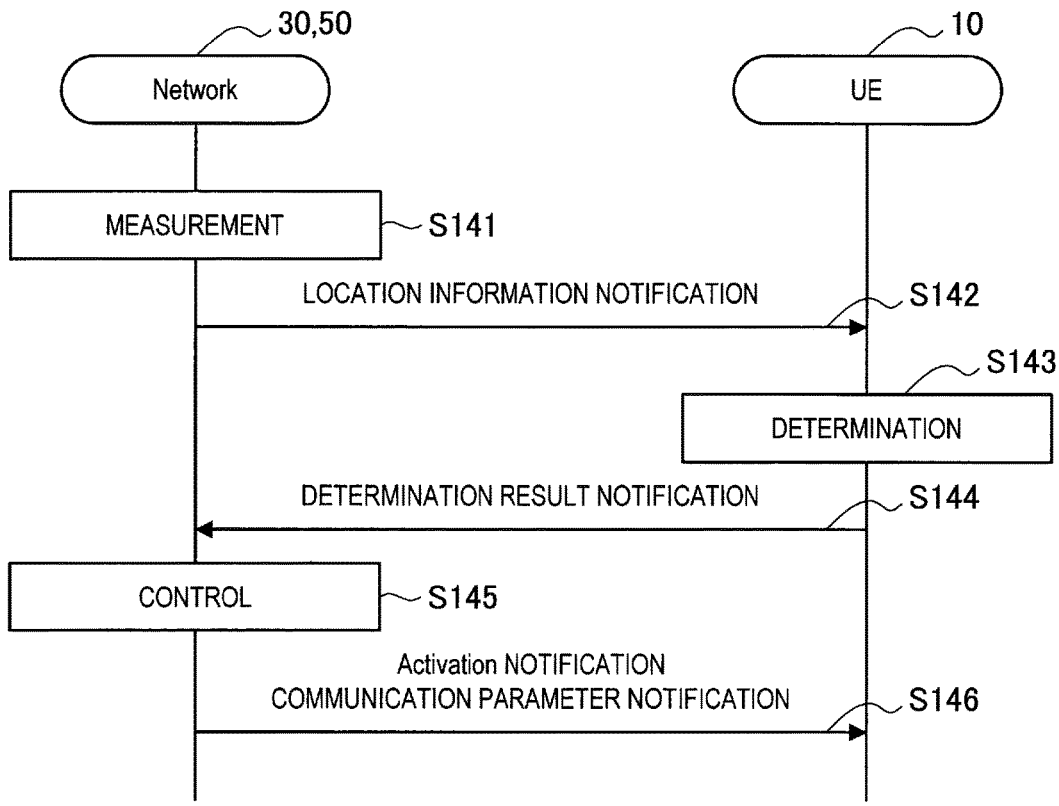
[Fig. 17]
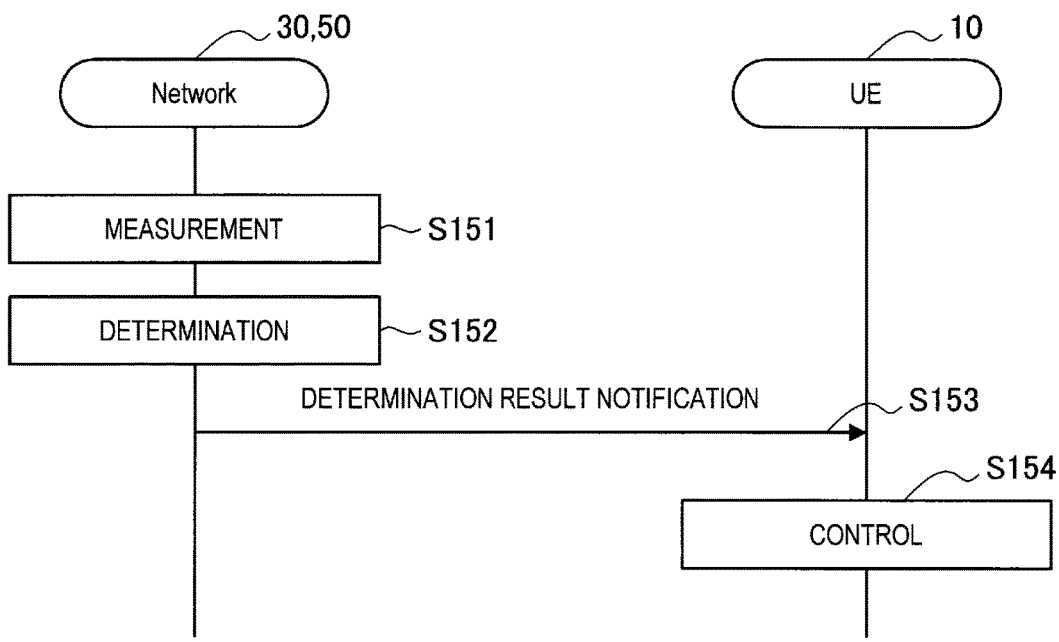

[Fig. 18]
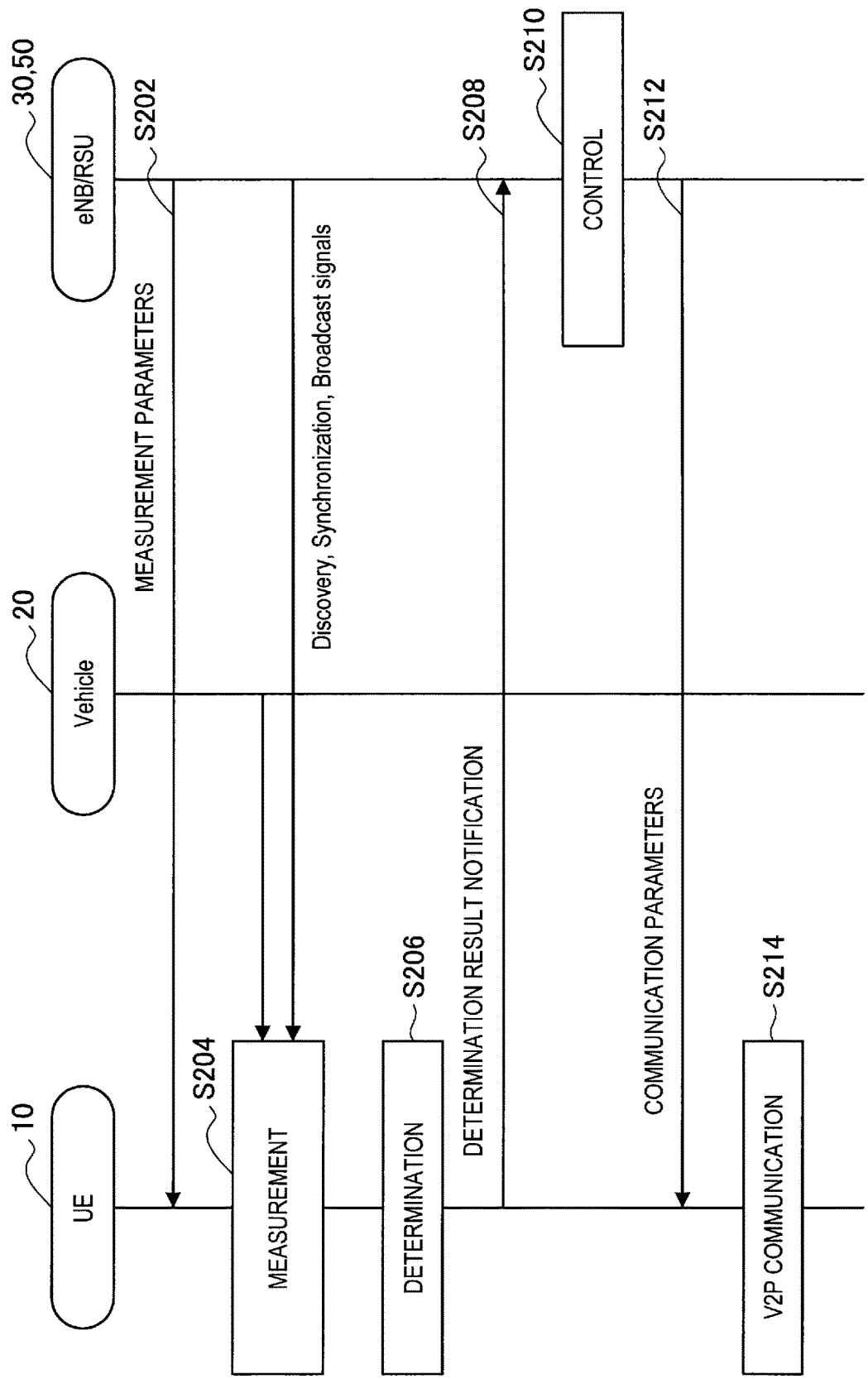

[Fig. 19]
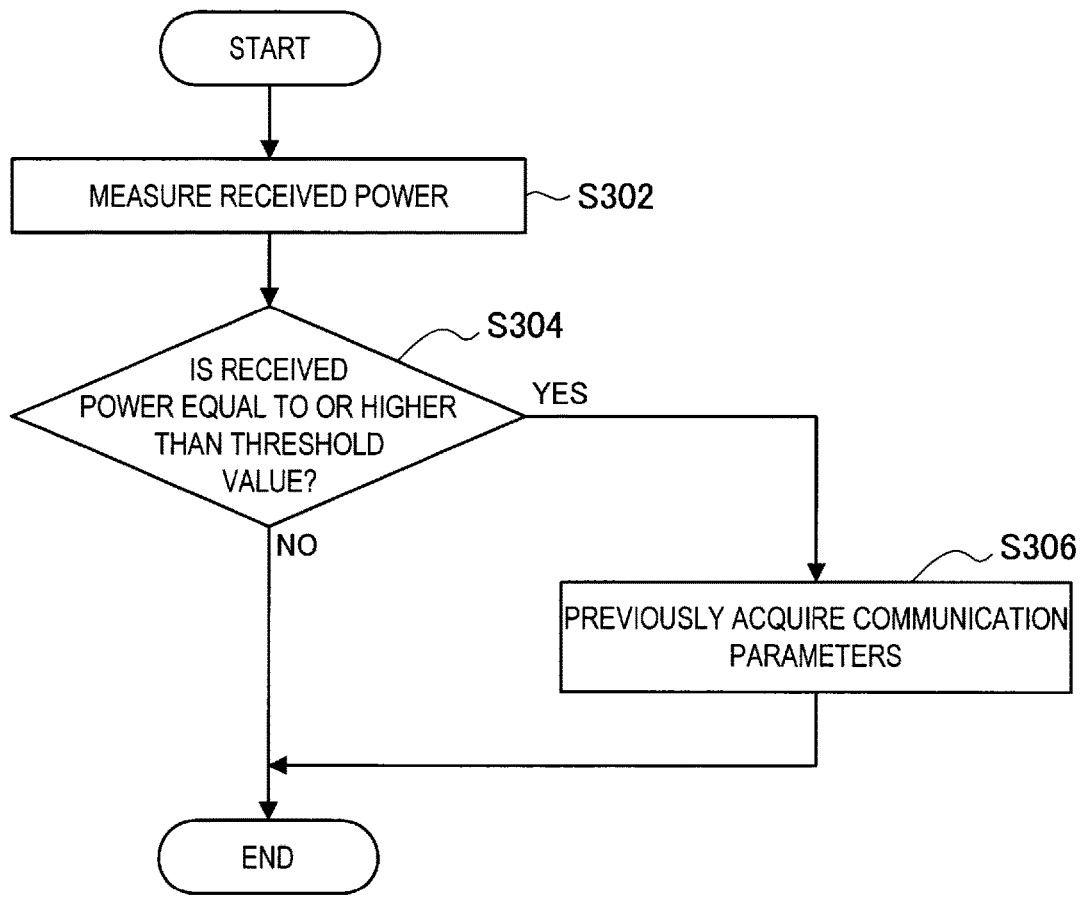

[Fig. 20]
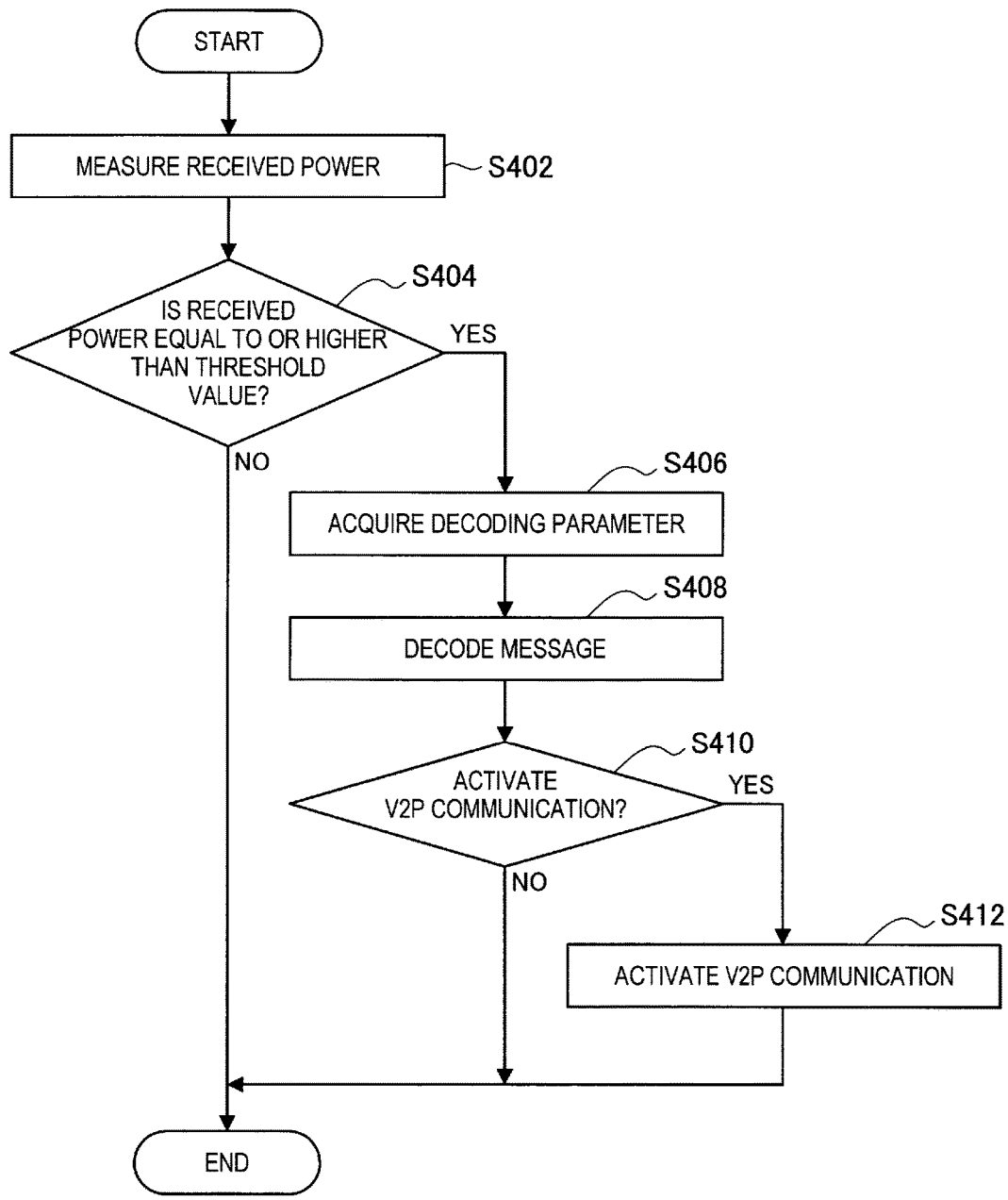

[Fig. 21]
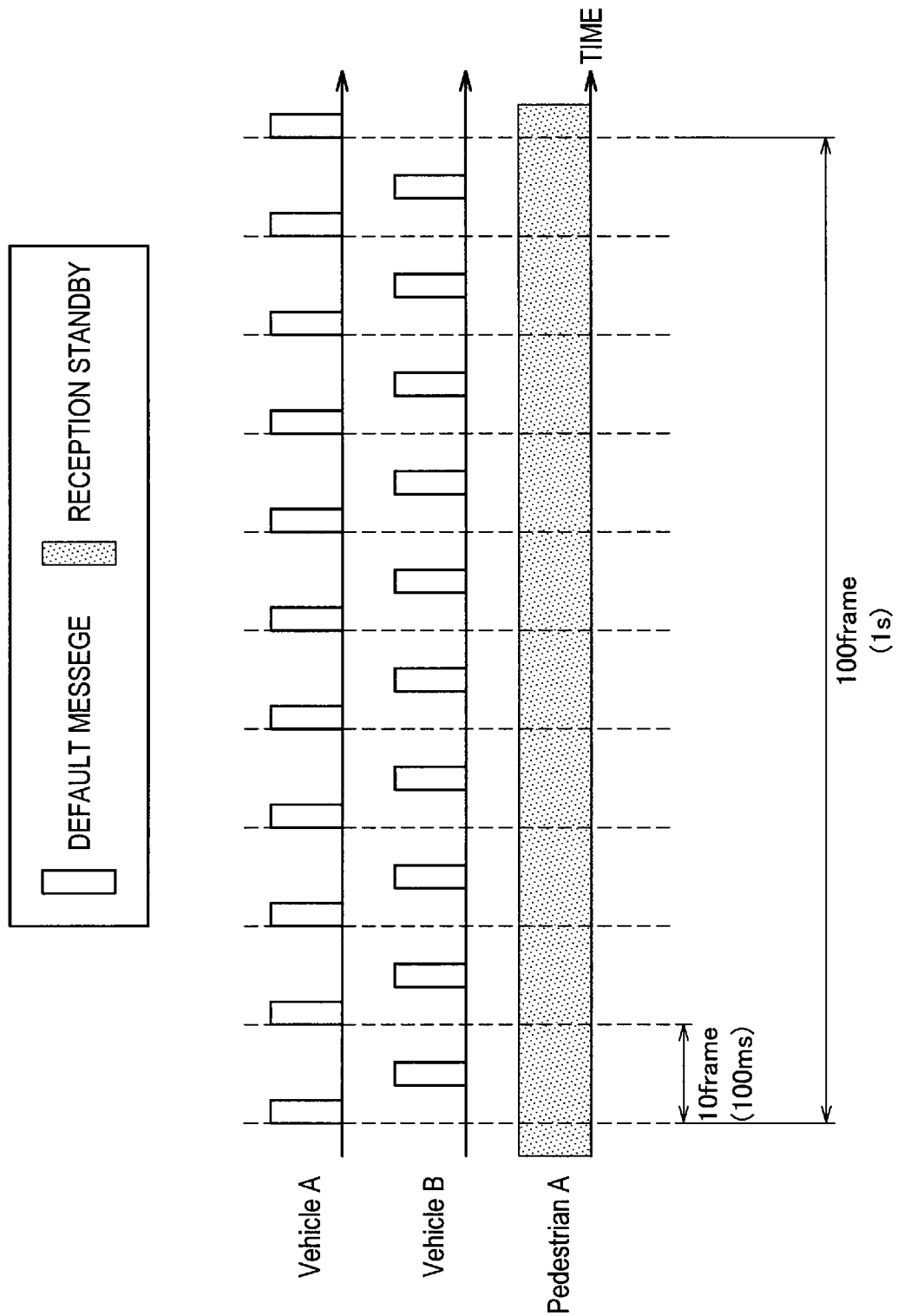

[Fig. 22]
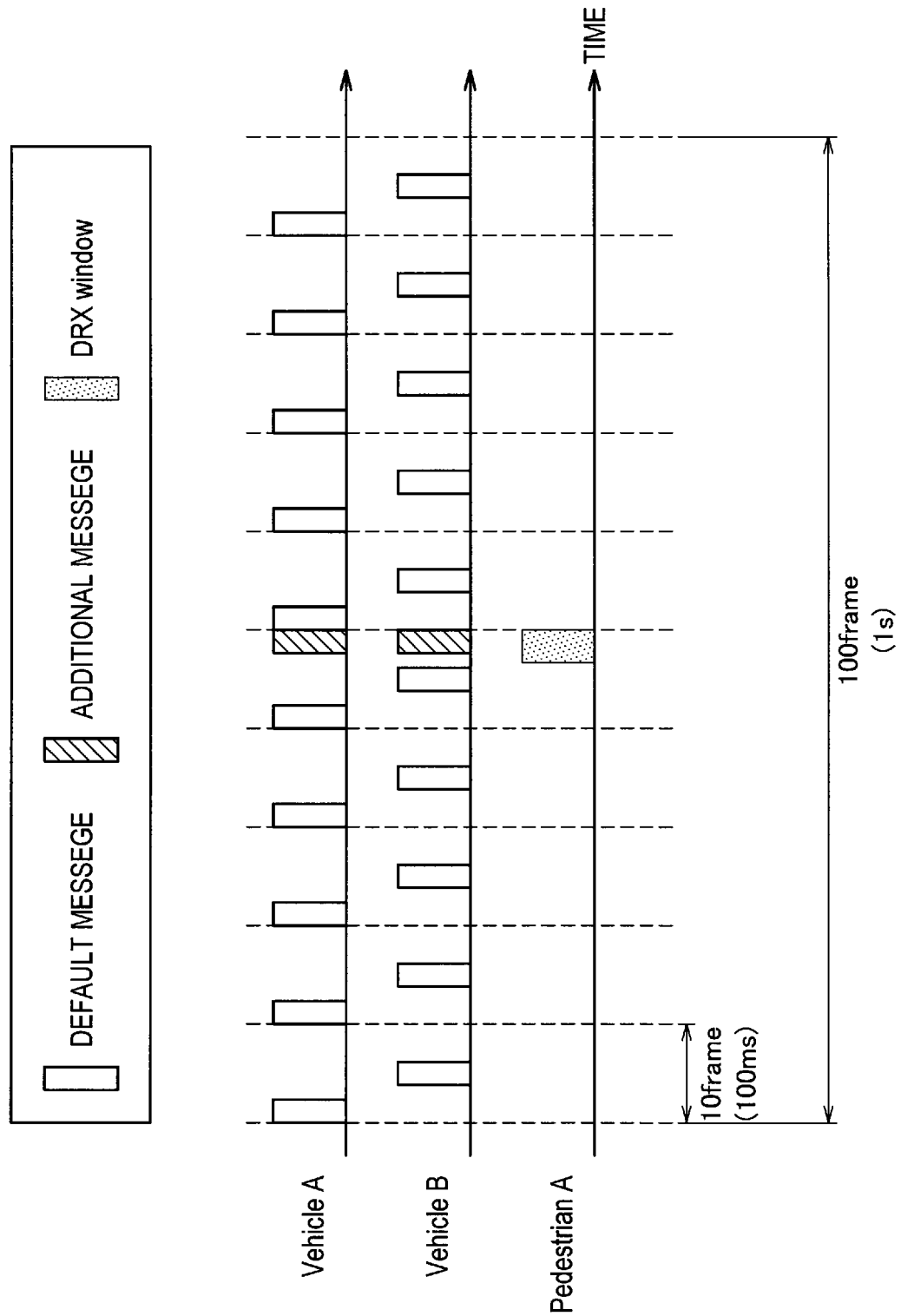

[Fig. 23]
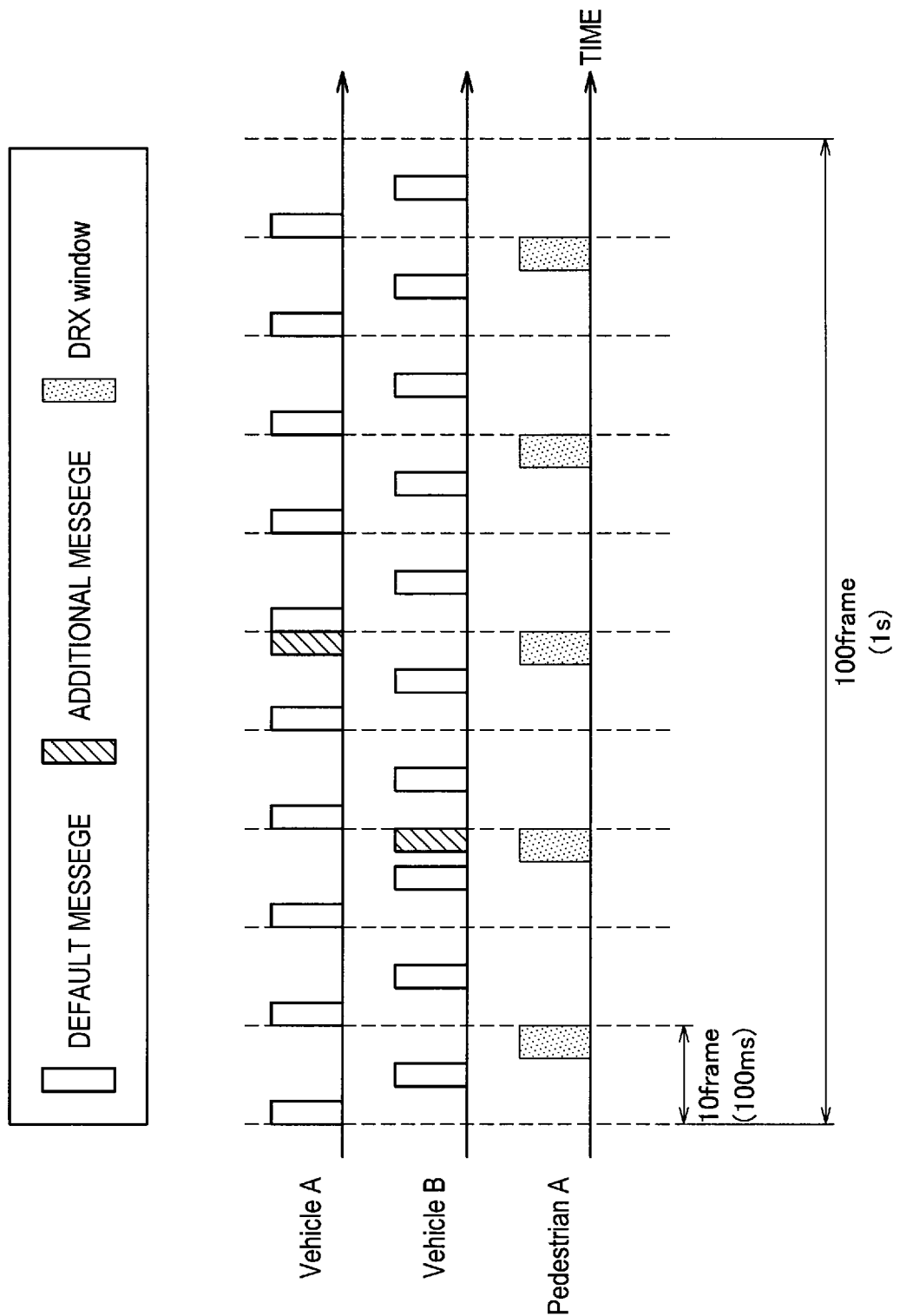

[Fig. 24]
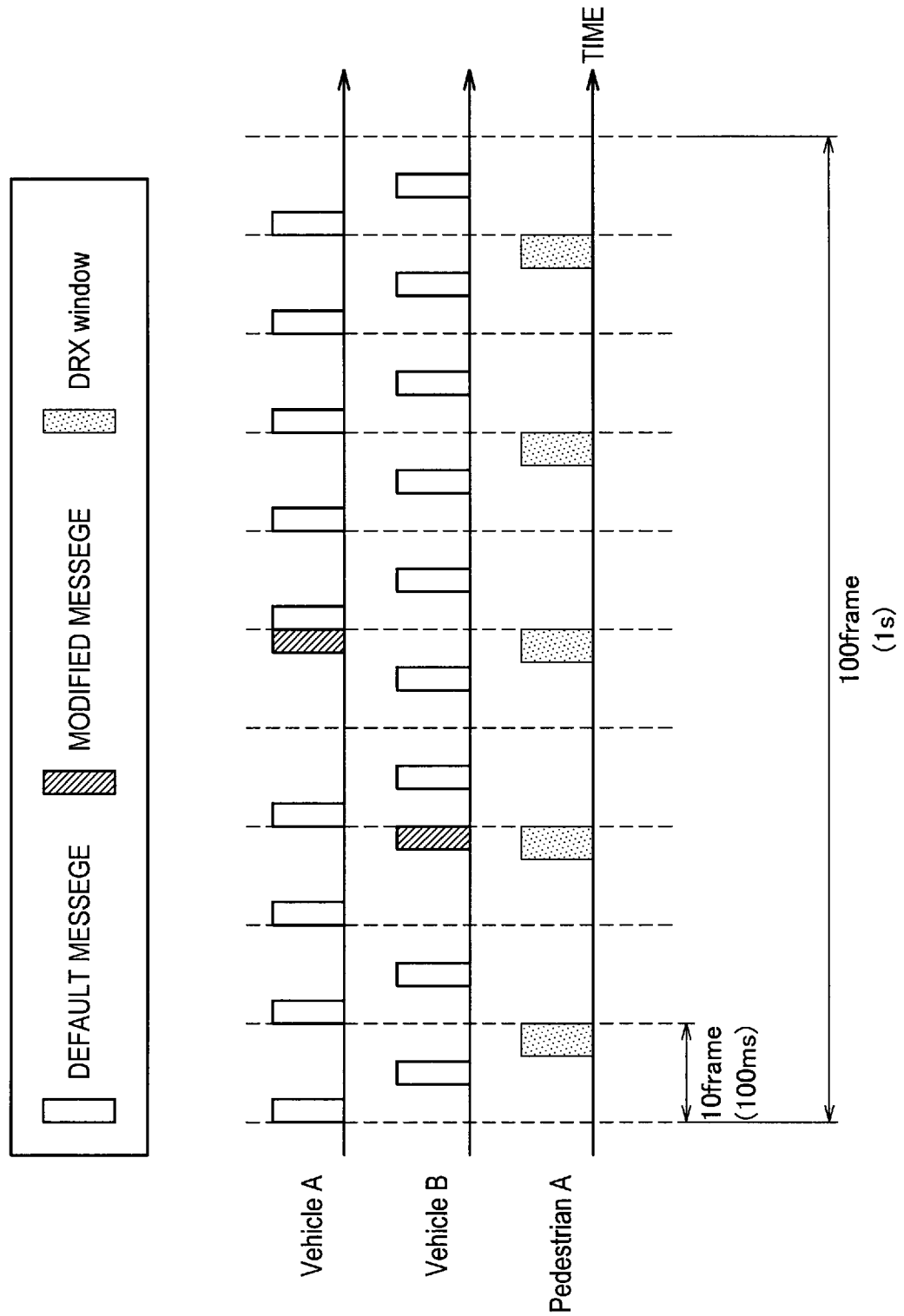

[Fig. 25]
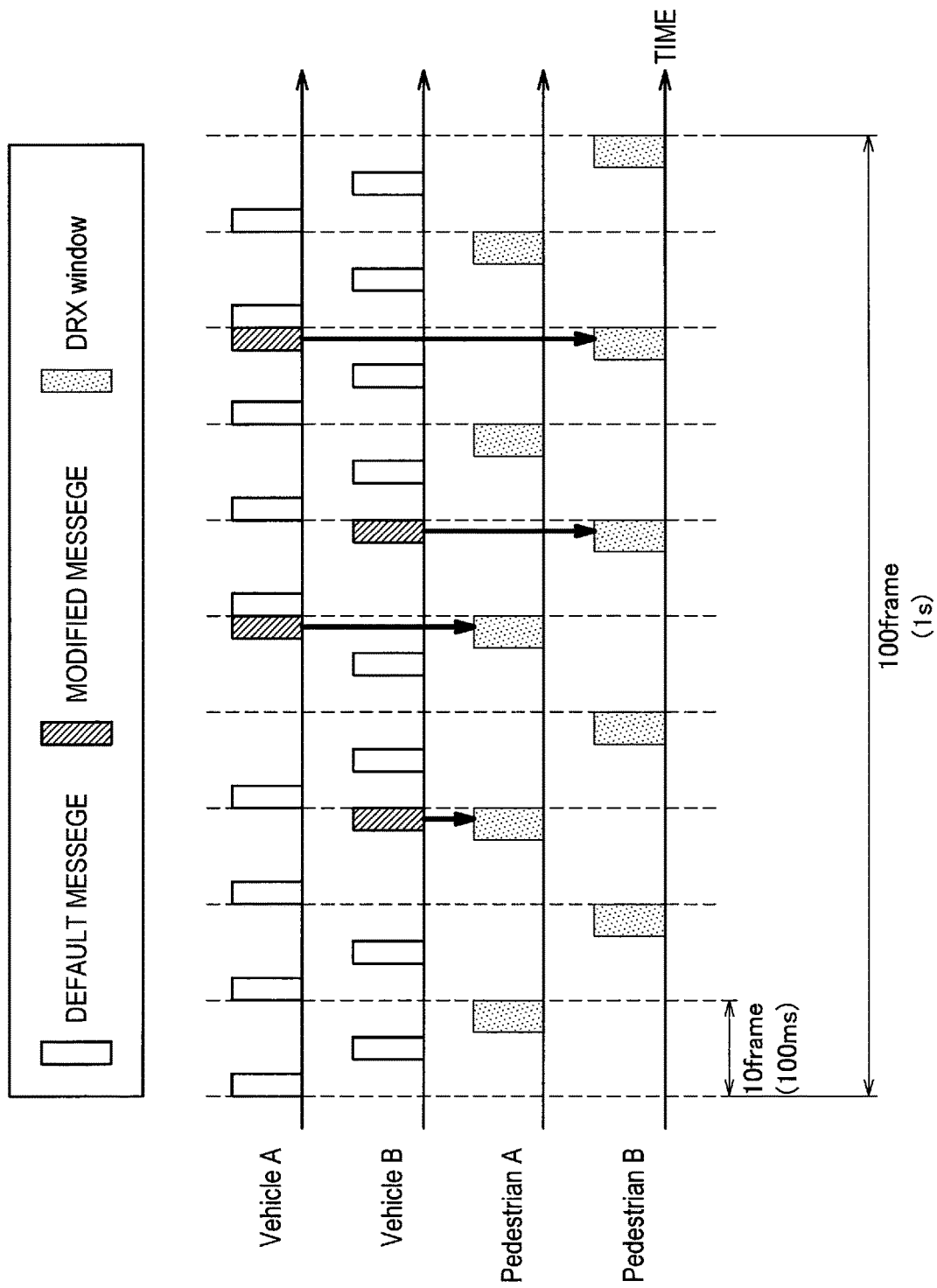

[Fig. 26]
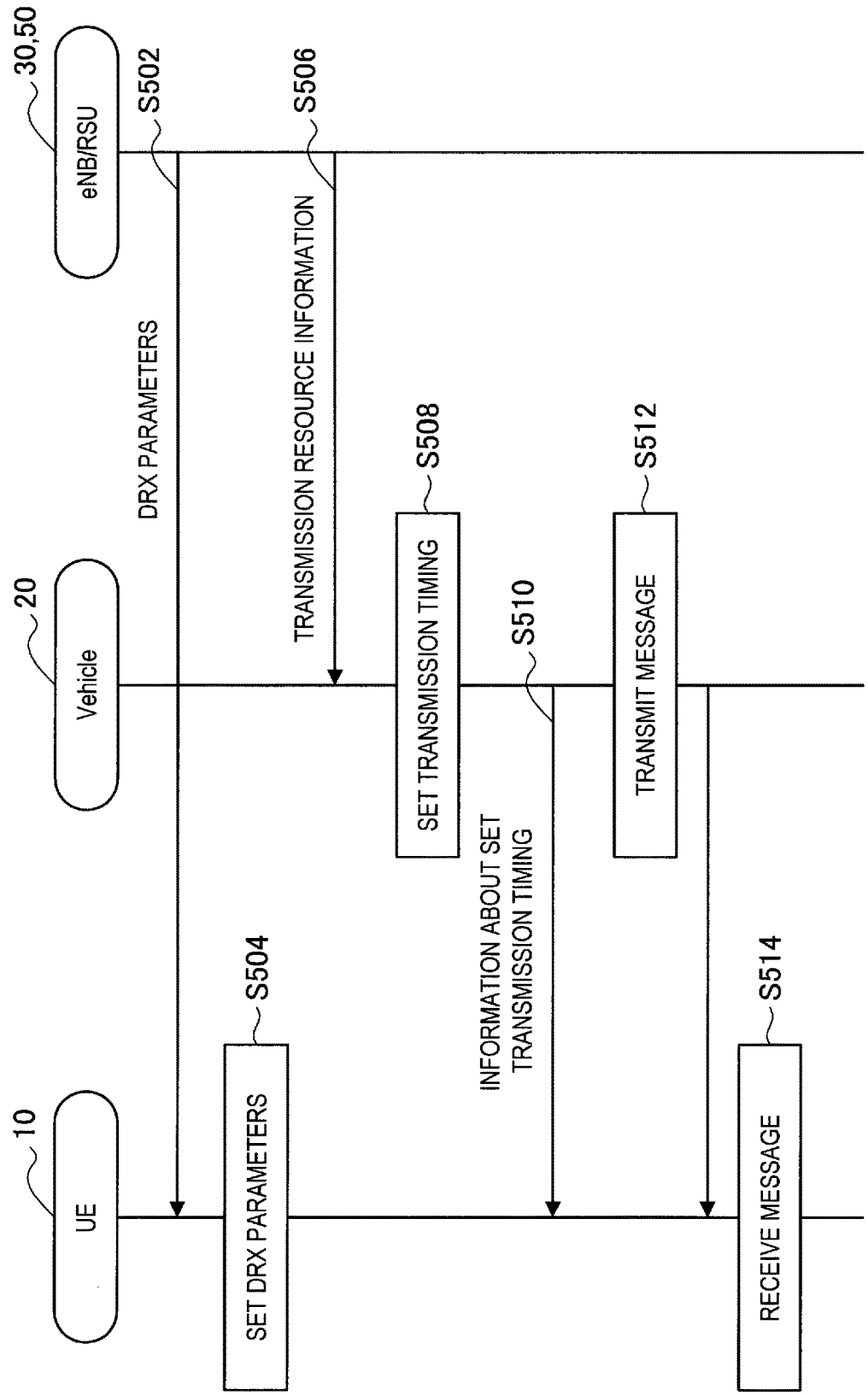

[Fig. 27]
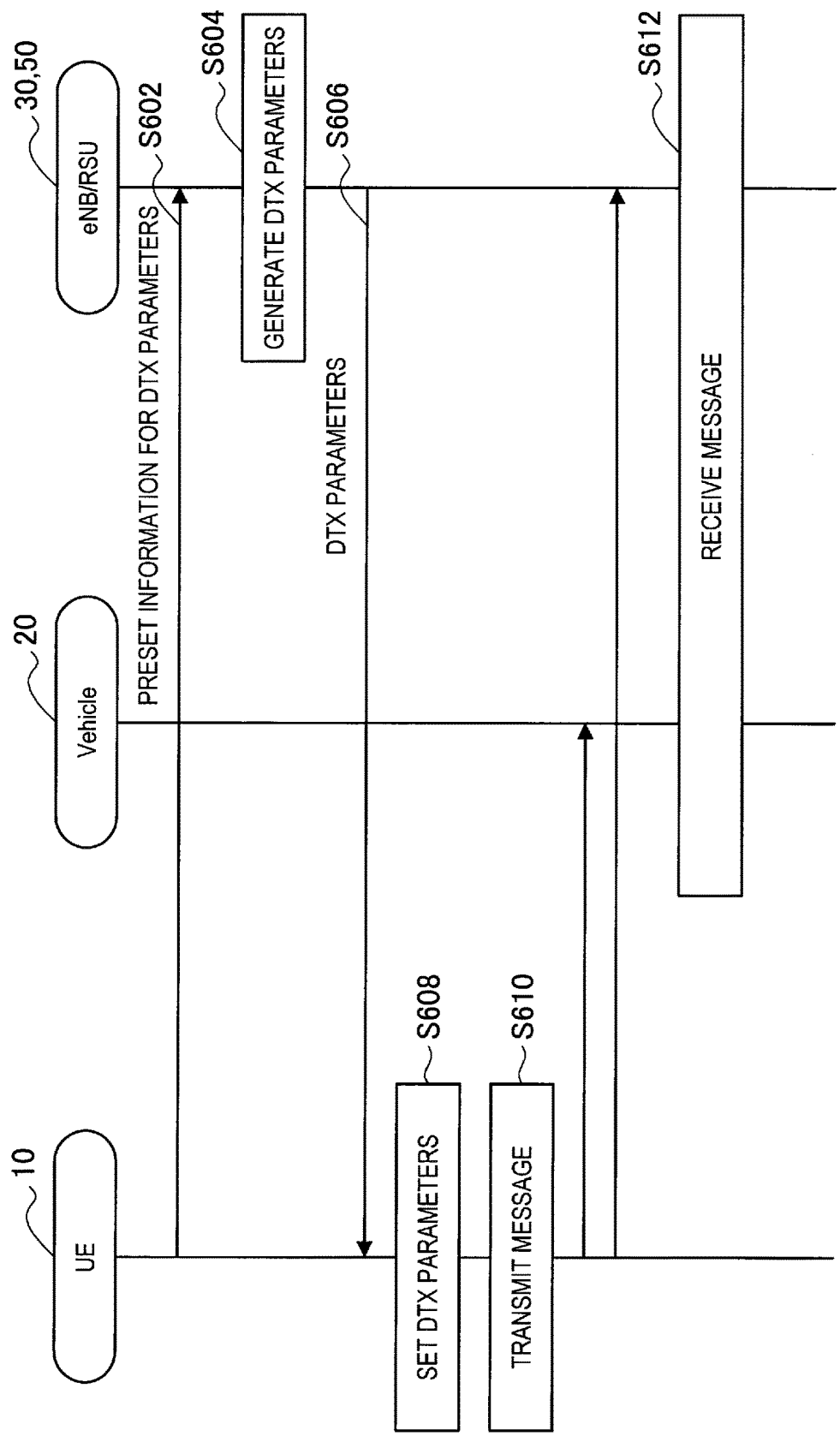

[Fig. 28]
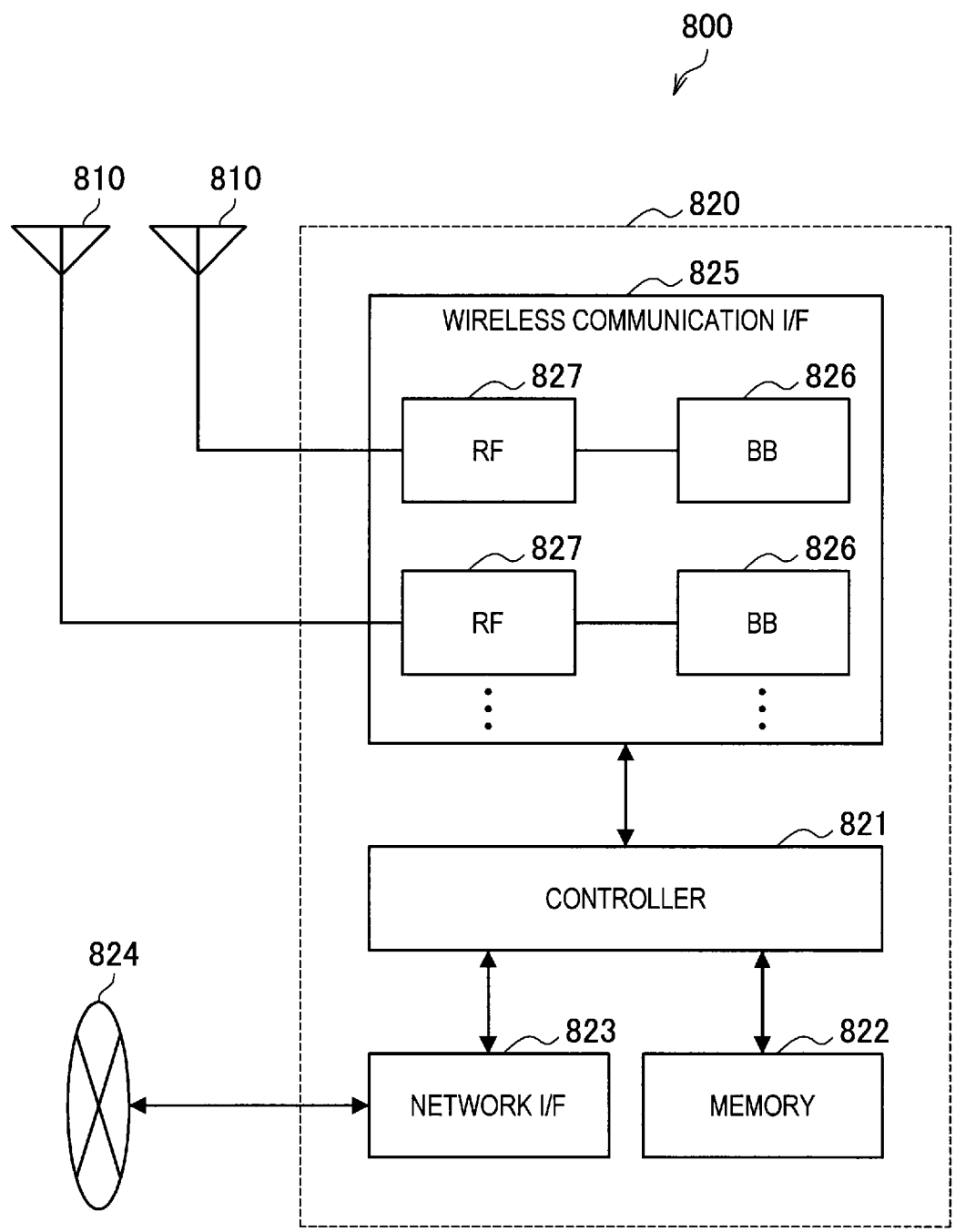

[Fig. 29]
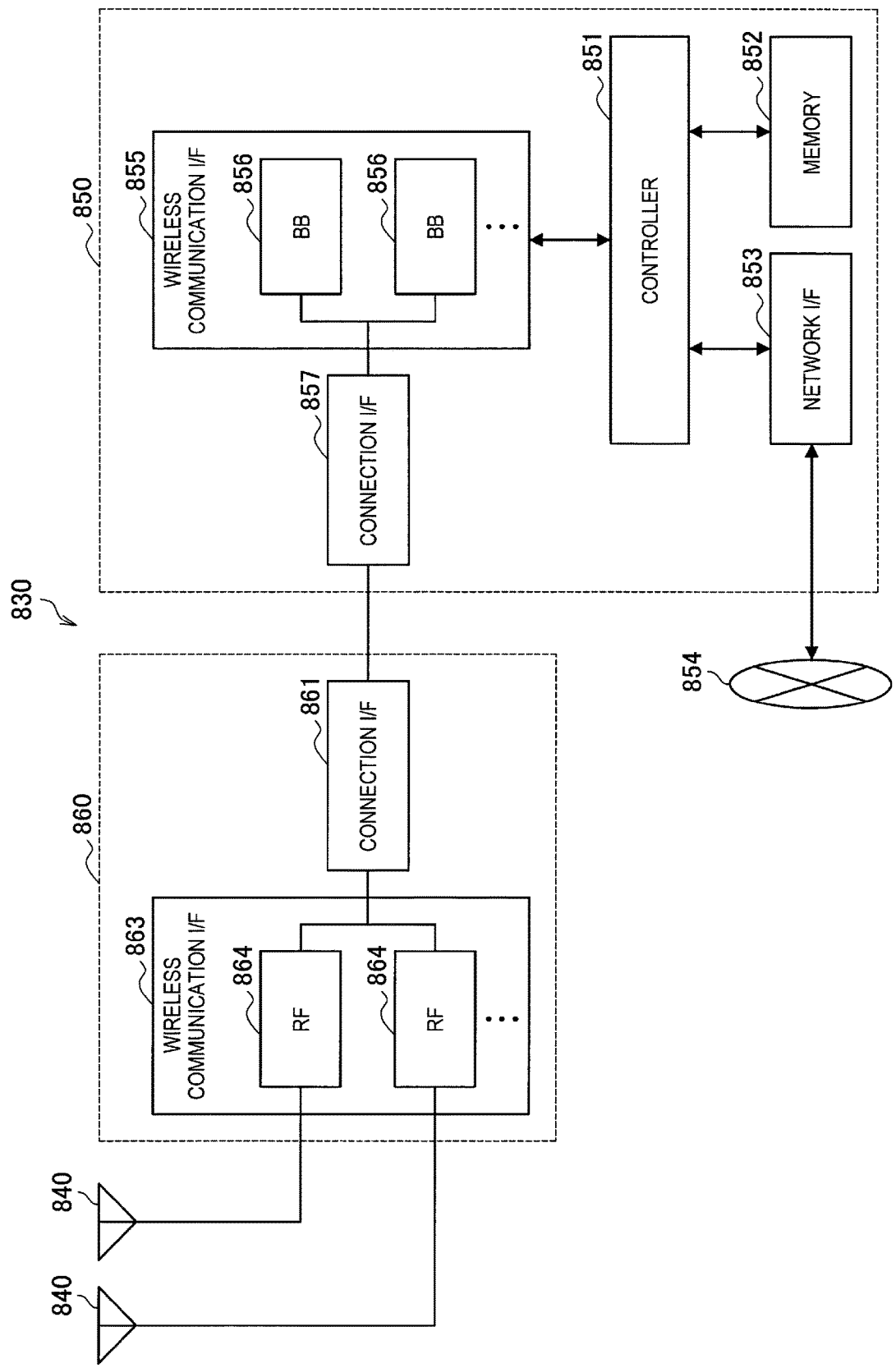

[Fig. 30]
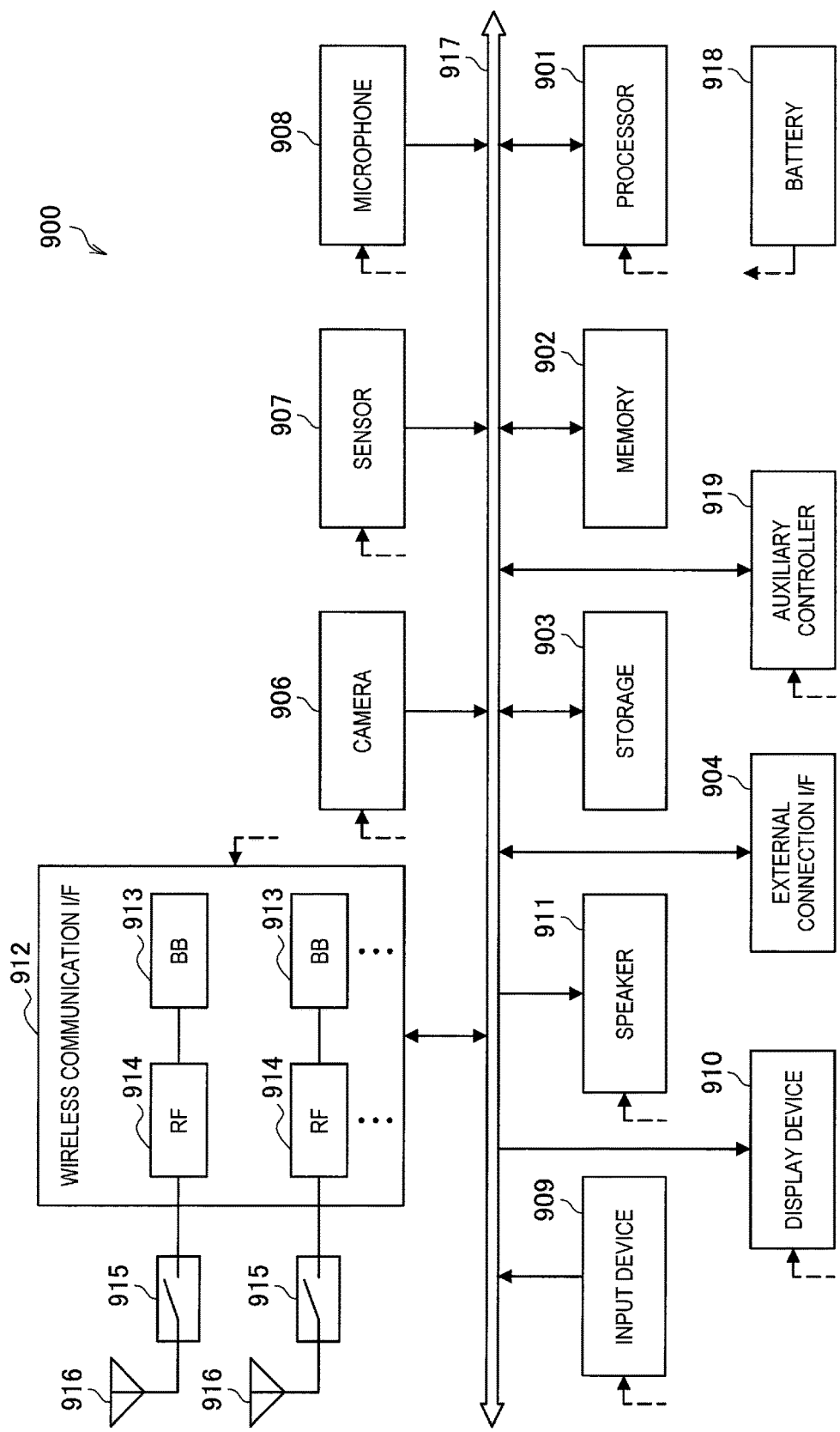

[Fig. 31]
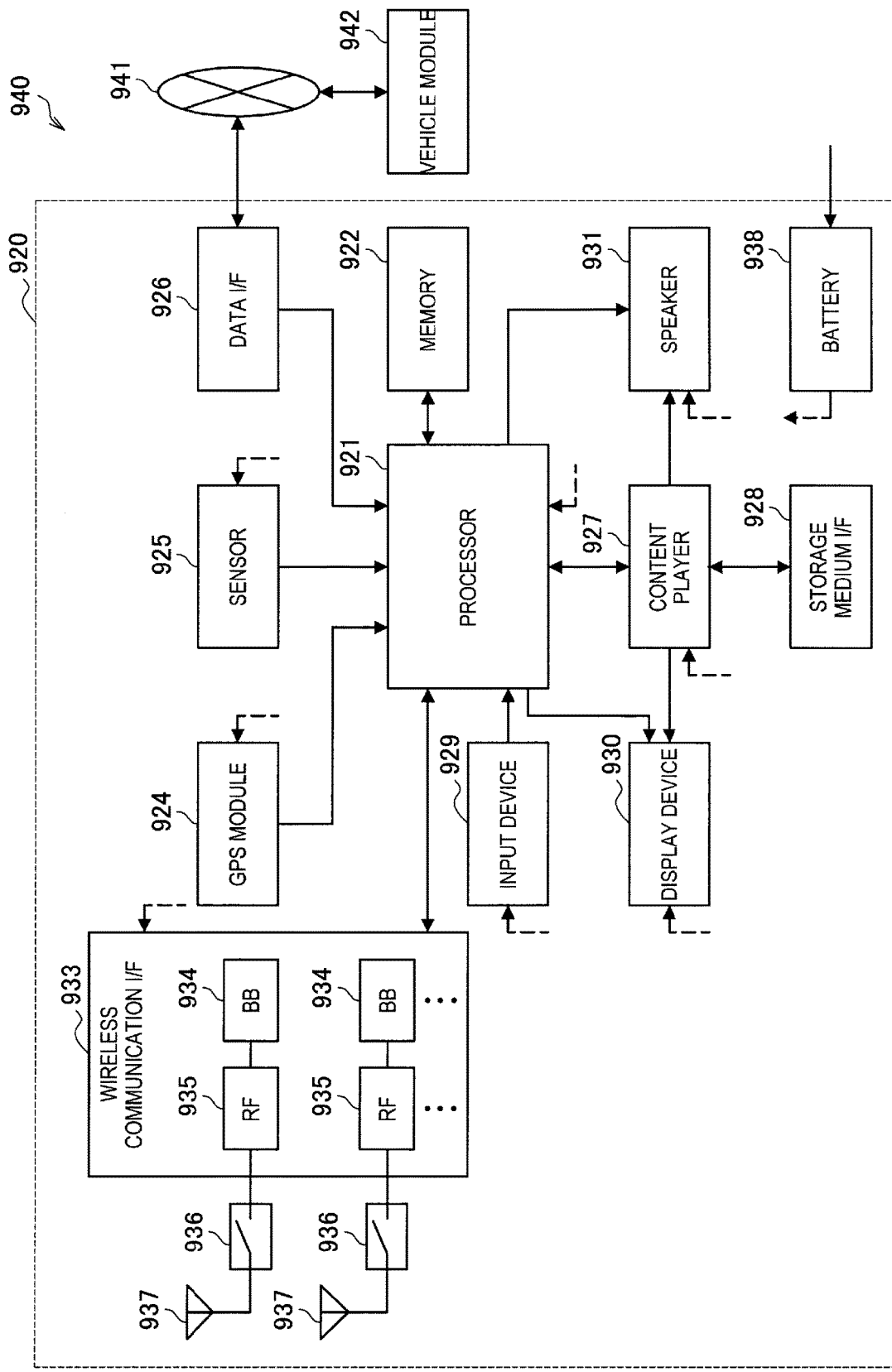

USER TERMINAL, RSU, METHOD AND PROGRAM

CROSS REFERENCE TO RELATED APPLICATIONS

This application claims the benefit of Japanese Priority Patent Application JP 2016-020141 filed Feb. 4, 2016, the entire contents of which are incorporated herein by reference.

TECHNICAL FIELD

The present disclosure relates to a user terminal, an RSU, a method and a program.

BACKGROUND ART

By utilizing a communication device onboard a moving object such as a vehicle, direct communication between the moving object and various target objects is realized. Communication between a communication device onboard a moving object and various other communication devices is called vehicle-to-X (V2X) communication. For V2X communication, communication systems utilizing dedicated short range communications (DSRC) have been investigated thus far, but recently, investigation into communication systems utilizing mobile phone communication standards such as Long Term Evolution (LTE) is progressing. A system related to the LTE communication standard is disclosed in NPL 1 below, for example.

CITATION LIST

Non Patent Literature

NPL 1: 3GPP TR 22. 885 "Study on LTE support for Vehicle to Everything (V2X) services"

SUMMARY

Technical Problem

In the V2X communication, a communication device carried by a pedestrian can contribute to secure safety of the pedestrian by performing communication with a communication device aboard a moving object, a communication device installed on the side of a road or the like. However, the quantity of power of the communication device carried by the pedestrian may be insufficient or the quantity of power that can be used for V2X communication may be limited, and thus it may be difficult to secure insufficient safety. Accordingly, it is desirable to provide a V2X communication scheme for reducing power consumption for a communication device carried by a pedestrian.

Solution to Problem

According to one exemplary embodiment, the disclosure is directed to an electronic device including: circuitry configured to perform wireless communication in accordance with vehicle-to-X (V2X) communication, the V2X communication including at least vehicle-to-vehicle (V2V) communication, vehicle-to-infrastructure (V2I) communication, or vehicle-to-pedestrian (V2P) communication, each of the V2V, V2I and V2P communications having an intermittent communication function; receive a signal associated with a location of the electronic device; determine whether to activate or deactivate a communication parameter corresponding to the V2P communication based on the signal associated with the location of the electronic device; activate or deactivate the communication parameter corresponding to the V2P communication based on the determining; and activate the intermittent communication function for the V2P communication in a case that that the parameter corresponding to the V2P communication is activated.

The circuitry may be configured to perform V2P communication with a vehicle mounted terminal device based on the activated or deactivated communication parameter According to another exemplary embodiment, the disclosure is directed to a wireless terminal configured for operation in a wireless network, the wireless terminal including: circuitry configured to receive a signal from a device operating in the wireless network; determine a position of the wireless terminal in relation to a vehicle-mounted wireless communication device based on the signal; determine to activate a communication parameter corresponding to vehicle-to-pedestrian (V2P) communication when the determined relative position indicates that the wireless terminal is within a predetermined range of the vehicle-mounted wireless communication device; and determine to deactivate a communication parameter corresponding to vehicle-to-pedestrian (V2P) communication when the determined relative position indicates that the wireless terminal is outside a predetermined range of the vehicle-mounted wireless communication device.

According to another exemplary embodiment, the disclosure is directed to a method performed by an electronic device, the method including: performing wireless communication in accordance with vehicle-to-X (V2X) communication, the V2X communication including at least vehicle-to-vehicle (V2V) communication, vehicle-to-infrastructure (V2I) communication, or vehicle-to-pedestrian (V2P) communication, each of the V2V, V2I and V2P communications having an intermittent communication function; receiving a signal associated with a location of the electronic device; determining whether to activate or deactivate a communication parameter corresponding to the V2P communication based on the signal associated with the location of the electronic device; activating or deactivating the communication parameter corresponding to the V2P communication based on the determining; and activating the intermittent communication function for the V2P communication in a case that that the parameter corresponding to the V2P communication is activated.

Advantageous Effects of Invention

According to an embodiment of the present disclosure described above, a V2X communication scheme for reducing power consumption for a communication device carried by a pedestrian is provided. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram for describing an overview of V2X communication.

FIG. 2 is an explanatory diagram for describing a first scenario of V2V communication.

FIG. 3 is an explanatory diagram for describing a second scenario of V2V communication.

FIG. 4 is an explanatory diagram for describing a third scenario of V2V communication.

FIG. 5 is an explanatory diagram for describing a fourth scenario of V2V communication.

FIG. 6 is an explanatory diagram for describing a fifth scenario of V2V communication.

FIG. 7 is an explanatory diagram illustrating a configuration of a wireless communication system according to an embodiment of the present disclosure.

FIG. 8 is a block diagram illustrating an example of a logical configuration of a UE according to the embodiment.

FIG. 9 is a block diagram illustrating an example of a logical configuration of a UE according to the embodiment.

FIG. 10 is a block diagram illustrating an example of a logical configuration of an eNB according to the embodiment.

FIG. 11 is a block diagram illustrating an example of a logical configuration of an RSU according to the embodiment.

FIG. 12 is a diagram for describing technical features of a first embodiment.

FIG. 13 is a diagram for describing technical features of the embodiment.

FIG. 14 is a diagram for describing technical features of the embodiment.

FIG. 15 is a diagram for describing technical features of the embodiment.

FIG. 16 is a diagram for describing technical features of the embodiment.

FIG. 17 is a diagram for describing technical features of the embodiment.

FIG. 18 is a diagram for describing technical features of the embodiment.

FIG. 19 is a diagram for describing technical features of the embodiment.

FIG. 20 is a diagram for describing technical features of the embodiment.

FIG. 21 is a diagram for describing technical features of a second embodiment.

FIG. 22 is a diagram for describing technical features of the embodiment.

FIG. 23 is a diagram for describing technical features of the embodiment.

FIG. 24 is a diagram for describing technical features of the embodiment.

FIG. 25 is a diagram for describing technical features of the embodiment.

FIG. 26 is a diagram for describing technical features of the embodiment.

FIG. 27 is a diagram for describing technical features of the embodiment.

FIG. 28 is a block diagram illustrating a first example of a schematic configuration of an eNB.

FIG. 29 is a block diagram illustrating a second example of a schematic configuration of an eNB.

FIG. 30 is a block diagram illustrating an example of a schematic configuration of a smartphone.

FIG. 31 is a block diagram illustrating an example of a schematic configuration of a car navigation device.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, multiple structural elements having substantially the same function and structure may in some cases be distinguished by different letters appended to the same sign. For example, multiple elements having substantially the same function and structure or logical significance are distinguished as UEs 10A, 10B, 10C, and so on as necessary. On the other hand, when not particularly distinguishing each of multiple structural elements having substantially the same function and structure, only the same sign will be given. For example, when not particularly distinguishing UEs 10A, 10B, 10C, each of the UEs 10A, 10B, 10C will be designated simply the UE 10.

Hereinafter, a description will be given in the following order.

1. Introduction
  1.1. V2X Communication
  1.2. Technical Problem
2. Examples of Configuration
  2.1. Examples of Configuration of System
  2.2. Example of Configuration of UE (user terminal)
  2.3. Example of Configuration of UE (moving object)
  2.4. Example of Configuration of eNB
  2.5. Example of Configuration of RSU
3. First Embodiment
4. Second Embodiment
5. Application Examples
6. Conclusion «1. Introduction»

<1.1. V2X Communication>

By utilizing a communication device onboard a moving object such as a vehicle, direct communication between the moving object and various target objects is realized. Communication between a vehicle and various target objects is called vehicle-to-X (V2X) communication. FIG. 1 is an explanatory diagram for describing an overview of V2X communication. As illustrated in FIG. 1, V2X communication may be vehicle-to-vehicle (V2V) communication, vehicle-to-infrastructure (V2I) communication, vehicle-to-pedestrian (V2P) communication, or vehicle-to-home (V2H) communication, for example. In addition, while not illustrated, V2X communication also includes vehicle to nomadic device (V2N) communication, for example. Here, the first character and the third character of V2V communication and the like respectively mean a start point and an end point and do not limit communication paths. For example, V2V communication is the concept including direct communication between moving objects and indirect communication view a base station.

As illustrated in FIG. 1, the communication target of a vehicle in V2V communication may be a passenger vehicle, a commercial or fleet vehicle, an emergency vehicle, or a transit vehicle, for example. Also, the communication target of a vehicle in V2I communication may be a cellular network, a data centre, a fleet or freight management centre, a traffic management centre, a weather service, a rail operation centre, a parking system, or a toll system, for example. Also, the communication target of a vehicle in V2P communication may be a cyclist, a pedestrian shelter, or a motorcycle, for example. Also, the communication target of a vehicle in V2H communication may be a home network, a garage, or enterprise or dealer networks, for example.

Note that in V2X communication, communication systems utilizing dedicated short range communications (DSRC) have been investigated, but recently, investigation into communication systems utilizing mobile phone communication standards such as Long Term Evolution (LTE) is progressing.

Examples of applications of V2X communication include communication systems intended for forward collision warning, loss of control warning, emergency vehicle warning, emergency stop, adaptive cruise assist, traffic condition warning, traffic safety, automatic parking, route deviation warning, message transmission, collision warning, communication range extension, traffic volume optimization, curve speed alert, pedestrian collision warning, or vulnerable person safety. In addition, V2X communication according to user equipment (UE) of a road side unit (RSU) type, minimum QoS of V2X communication, V2X access during roaming, message provision through V2P communication for traffic safety of pedestrians, mixed use for traffic management, improvement of positioning accuracy for traffic participants or the like are investigated.

A list of requirements for the above application examples is shown in the following table 1.

ing objects such as vehicles directly perform V2V communication. A communication link in this case may be called sidelink (SL).

FIG. 3 is an explanatory diagram for describing a second scenario of V2V communication. In the second scenario, moving objects such as vehicles indirectly perform V2V communication via evolved universal terrestrial radio access (E-UTRAN), that is, a base station. A communication link from a transmitting side to the base station is called uplink (UL) and a communication link from the base station to a receiving side is called downlink (DL).

FIG. 4 is an explanatory diagram for describing a third scenario of V2V communication. In the third scenario, a moving object such as a vehicle transmits a signal to other moving objects sequentially through an RSU or a UE of RSU type and E-UTRAN. Communication links between the devices are sequentially called SL, UL and DL.

FIG. 5 is an explanatory diagram for describing a fourth scenario of V2V communication. In the fourth scenario, a moving object such as a vehicle transmits a signal to other moving objects sequentially through E-UTRAN and an RSU or a UE of RSU type. Communication links between the devices are sequentially called UL, DL and SL.

TABLE 1

| | Effective range | Absolute velocity of UE supporting V2X service | Relative velocity between two UEs supporting V2X service | Maximum tolerable latency | Minimum radio layer message reception reliability (probability that recipient gets it within 100 msec) | Example of cumulative transmission reliability |
|---|---|---|---|---|---|---|
| #1 Suburb | 200 m | 50 kmph | 100 kmph | 100 ms | 90% | 99% |
| #2 Main road | 320 m | 160 kmph | 280 kmph | 100 ms | 80% | 96% |
| #3 Freeway | 320 m | 280 kmph | 280 kmph | 100 ms | 80% | 96% |
| #4 City | 150 m | 50 kmph | 100 kmph | 100 ms | 90% | 99% |
| #5 City intersection | 50 m | 50 kmph | 100 kmph | 100 ms | 95% | — |
| #6 Campus/ commercial district | 50 m | 30 kmph | 30 kmph | 100 ms | 90% | 99% |

To meet the above requirements, standardization of the physical layer of V2X is being investigated in 3GPP. A base technology of V2X communication may be device-to-device (D2D) communication that was standardized in the past in 3GPP. Since D2D communication is communication between terminals without a base station, D2D communication may be considered to aim for extension to V2V communication, V2P communication or part of V2I communication. Such an interface between terminals is called a PC5 interface. For V2I communication or V2N, extension of a previous technology of communication between a base station and a terminal, such as LTE, is being considered. Such an interface between a base station and a terminal is called a Uu interface. In future investigation, it will be necessary to extend the PC5 interface and the Uu interface to meet the above requirements. Main extension points may be, for example, improvement of resource allocation, Doppler frequency measures, establishment of a synchronization method, realization of low power consumption communication, realization of low delay communication and so on.

Various operation scenarios of V2X communication are considered. As an example, examples of operation scenarios of V2V communication will be described with reference to FIGS. 2 to 6.

FIG. 2 is an explanatory diagram for describing a first scenario of V2V communication. In the first scenario, mov- FIG. 6 is an explanatory diagram for describing a fifth scenario of V2V communication. In the fifth scenario, moving objects such as vehicles indirectly perform V2V communication through an RSU or a UE of RSU type. Communication links between the moving objects and the RSU or UE of RSU type are SL.

The above-described scenarios become scenarios of V2P communication when one of the moving objects is changed to a pedestrian. Similarly, the scenarios become scenarios of V2I communication or V2N communication when one of the moving objects is changed to an infrastructure or a network, respectively.

<1.2. Technical Problem>

In V2P communication, communication is performed between a communication device aboard a moving object and a communication device carried by a pedestrian. An example of requirements in V2P communication will be described below. As a relay requirement, delay within 500 ms from a server to a terminal and within 100 ms for end-to-end is considered. As an operation requirement, handling multiple mobile network operators (MNO) is considered. As a power consumption requirement, minimization of battery consumption is considered. As a coverage requirement, coverage of a range in which V2P communication can be performed 4 seconds or longer before collision is considered. For example, in the case of 100 km an hour, coverage having a diameter of approximately 110.8 m or longer corresponding to 27.7 m/s×4 s is necessary. As a message requirement, typically 50 to 300 bytes, and a maximum of 1,200 bytes is considered. As a communication quality requirement, establishment of communication in environments in which a relative speed of a motorcycle and a car is 280 km/h and a relative speed of a pedestrian and a car is 160 km/h is considered.

A technical task of the present disclosure is minimization of battery consumption from among the aforementioned requirements. A smartphone or the like considered as a communication device carried by a pedestrian has insufficient battery capacity in many cases. Accordingly, minimization of battery consumption may be regarded as an important task for introduction of V2P communication.

«2. Examples Of Configuration»

Hereinafter, examples of a configuration of a wireless communication system that is common among embodiments will be described.

<2.1. Example of Configuration of System>

FIG. 7 is an explanatory diagram illustrating a configuration of a wireless communication system according to an embodiment of the present disclosure. As illustrated in FIG. 7, the wireless communication system according to the embodiment of the present disclosure includes a UE 10, a UE 20, a vehicle 22, an eNB 30, a GNSS satellite 40 and an RSU 50.

The eNB 30 is a cellular base station that provides a cellular communication service to the UE 20 positioned inside a cell. For example, the eNB 30 schedules resources for the UEs 10 and 20 to communicate by, and notifies the UEs 10 and 20 of the scheduled resources. Additionally, the eNB 30 conducts uplink communication or downlink communication with the UEs 10 and 20 in the relevant resources.

The GNSS satellite 40 is an artificial satellite (communication device) that revolves around the earth in a predetermined orbit. The GNSS satellite 40 transmits a global navigation satellite system (GNSS) signal including a navigation message. The navigation message includes various types of information for positioning, such as orbit information and time information of the GNSS satellite 40.

The RSU 50 is a communication device installed on the side of a road. The RSU 50 may perform bi-directional communication with the vehicle 22, the UE 20 aboard the vehicle 22 or the UE 10 carried by a user 12. While the RSU 50 may perform DSRC with the vehicle 22, the UE 20 aboard the vehicle 22 or the UE 10 carried by the user 12, the RSU 50 is assumed to communicate with the vehicle 22, the UE 20 aboard the vehicle 22 or the UE 10 carried by the user 12 through cellular communication system in the present embodiment.

The UE 20 is a communication device that is mounted on the vehicle 22 and moves along with traveling of the vehicle 22. The UE 20 has a function of communicating with the eNB 30 according to control by the eNB 30. In addition, the UE 20 has functions of receiving the GNSS signal transmitted from the GNSS satellite 40 and measuring location information of the UE 20 from the navigation message included in the GNSS signal. Further, the UE 20 has a function of communicating with the RSU 50. Moreover, the UE 20 according to the present embodiment may perform direct communication with the UE 10 carried by the user 12 or the UE 20 aboard another vehicle 22, that is, D2D communication. Hereinafter, the UE 20 and the moving object 22 are collectively called UE 20 if the UE 20 and the moving object 22 may not be distinguished.

The UE 10 is a communication device that is carried by the user 12 and moves along with walking or running of the user 12 or movement of a vehicle (a bus, a motorcycle, a car or the like) that the user 12 is riding. The UE 10 has a function of communicating with the eNB 30 according to control by the eNB 30. In addition, the UE 10 has functions of receiving the GNSS signal transmitted from the GNSS satellite 40 and measuring location information of the UE 10 from the navigation message included in the GNSS signal. Further, the UE 10 has a function of communicating with the RSU 50. Moreover, the UE 10 according to the present embodiment may perform direct communication with another UE 10 or the UE 20, that is, D2D communication. Communication between the UE 10 and the UE 20 is called V2P communication.

Note that although FIG. 7 illustrates the vehicle 22 as an example of a moving object, the moving object is not limited to the vehicle 22. For example, the moving object may also be an object such as a marine vessel, an aircraft, or a bicycle. In addition, although the above describes the UE 20 as including the function of receiving the GNSS signal, the vehicle 22 may have the function of receiving the GNSS signal, and the vehicle 22 may output a GNSS signal reception result to the UE 20.

<2.2. Example of Configuration of UE (User Terminal)>

FIG. 8 is a block diagram illustrating an example of a logical configuration of the UE 10 according to an embodiment of the present disclosure. As illustrated in FIG. 8, the UE 10 according to the present embodiment includes an antenna part 110, a wireless communication unit 120, a GNSS signal processing unit 130, a storage unit 140 and a processing unit 150.

The antenna part 110 radiates a signal output from the wireless communication unit 120 as radio waves to the air. In addition, the antenna part 110 converts radio waves of the space into a signal and outputs the signal to the wireless communication unit 120.

The wireless communication unit 120 transmits and receives signals. For example, the wireless communication unit 120 receives a downlink signal from the eNB 30 and transmits an uplink signal to the eNB 30. Furthermore, the wireless communication unit 120 transmits/receives a sidelink signal to/from another UE 10, the UE 20 or the RSU 50.

The GNSS signal processing unit 130 is a component that processes the GNSS signal transmitted from the GNSS satellite 40. For example, the GNSS signal processing unit 130 measures location information and time information of the UE 10 by processing the GNSS signal.

The storage unit 140 stores programs and various types of data for operations of the UE 10 temporarily or permanently.

The processing unit 150 provides various functions of the UE 10. For example, the processing unit 150 controls communication performed by the wireless communication unit 120.

<2.3. Example of Configuration of UE (Moving Object)>

FIG. 9 is a block diagram illustrating an example of a logical configuration of the UE 20 according to an embodiment of the present disclosure. As illustrated in FIG. 9, the UE 20 according to the present embodiment includes an antenna part 210, a wireless communication unit 220, a GNSS signal processing unit 230, a storage unit 240 and a processing unit 250.

The antenna part 210 radiates a signal output from the wireless communication unit 220 as radio waves to the space. In addition, the antenna part 210 converts radio waves of the space into a signal and outputs the signal to the wireless communication unit 220.

The wireless communication unit 220 transmits and receives signals. For example, the wireless communication unit 220 receives a downlink signal from the eNB 30 and transmits an uplink signal to the eNB 30. Furthermore, the wireless communication unit 220 transmits/receives a side link signal to/from the UE 10, another UE 20 or the RSU 50.

The GNSS signal processing unit 230 is a component that processes the GNSS signal transmitted from the GNSS satellite 40. For example, the GNSS signal processing unit 230 measures location information and time information of the UE 20 by processing the GNSS signal.

The storage unit 240 stores programs and various types of data for operations of the UE 20 temporarily or permanently.

The processing unit 250 provides various functions of the UE 20. For example, the processing unit 250 controls communication performed by the wireless communication unit 220.

<2.4. Example of Configuration of eNB>

FIG. 10 is a block diagram illustrating an example of a logical configuration of the eNB 30 according to an embodiment of the present disclosure. As illustrated in FIG. 10, the eNB 30 according to the present embodiment includes an antenna part 310, a wireless communication unit 320, a network communication unit 330, a storage unit 340 and a processing unit 350.

The antenna part 310 radiates a signal output from the wireless communication unit 320 as radio waves to the space. In addition, the antenna part 310 converts radio waves of the space into a signal and outputs the signal to the wireless communication unit 320.

The wireless communication unit 320 transmits and receives signals. For example, the wireless communication unit 320 receives an uplink signal from the UE 10, the UE 20 or the RSU 50 and transmits a downlink signal to the UE 10, the UE 20 or the RSU 50.

The network communication unit 330 transmits and receives information. For example, the network communication unit 330 transmits information to other nodes and receives information from other nodes. For example, the other nodes include other base stations and a core network node.

The storage unit 340 stores programs and various types of data for operations of the eNB 30 temporarily or permanently.

The processing unit 350 provides various functions of the eNB 30. For example, the processing unit 350 controls communication performed by the UE 10, the UE 20 and the RSU 50 subordinate thereto.

<2.5. Example of Configuration of RSU>

FIG. 11 is a block diagram illustrating an example of a logical configuration of the RSU 50 according to an embodiment of the present disclosure. As illustrated in FIG. 11, the RSU 50 according to the present embodiment includes an antenna part 510, a wireless communication unit 520, a storage unit 530 and a processing unit 540.

The antenna part 510 radiates a signal output from the wireless communication unit 520 as radio waves to the space. In addition, the antenna part 510 converts radio waves of the space into a signal and outputs the signal to the wireless communication unit 520.

The wireless communication unit 520 transmits and receives signals. For example, the wireless communication unit 520 receives a downlink signal from the eNB 30 and transmits an uplink signal to the eNB 30. Furthermore, the wireless communication unit 520 transmits/receives a side link signal to/from the UE 10, the UE 20 or another RSU 50.

The storage unit 530 stores programs and various types of data for operations of the RSU 50 temporarily or permanently.

The processing unit 540 provides various functions of the RSU 50. For example, the processing unit 540 controls communication performed by the wireless communication unit 520.

Configuration examples which are common in embodiments have been described.

Next, technical features of the respective embodiments will be described in detail.

«3. First Embodiment»

The present embodiment reduces power consumption by activating or deactivating the communication function of the UE 10 depending on position.

The UE 10 activates or deactivates the communication function by the wireless communication unit 120 on the basis of information acquired depending on position. For example, the UE 10 activates the communication function at a position at which a possibility of crash with the moving object 22 is high (e.g., the vicinity of a road or the like) and deactivates the communication function at a position at which the possibility is low (e.g., inside of a building). Accordingly, a communication function activation period may be minimized and thus power consumption may be reduced.

Particularly, the activated or deactivated communication function is the V2P communication function in the present embodiment. Of course, the V2P communication function corresponding to an activation or deactivation target includes the function of directly communicating with the UE 20 using a sidelink and the function of performing indirect communication using a sidelink, uplink and downlink.

On the other hand, the UE 20, the eNB 30 or the RSU 50 notifies the UE 10 of information for activating or deactivating V2P communication by the UE 10. The information includes communication parameters, measurement parameters and the like which will be described below.

Activation is the concept including validation of all or a part of a communication function, operation mode switching from a power-saving mode to a normal operation mode and so on. Deactivation is the concept including invalidation of all or a part of a communication function, operation mode switching from the normal operation mode to the power-saving mode and so on.

(1) Activation/Deactivation Depending on Location Information

Information acquired depending on position may be location information of the UE 10. For example, the UE 10 measures the location information, determines necessity of activation or deactivation and controls activation or deactivation processing. Such steps may be performed by the UE 10 or a device other than the UE 10. The device other than the UE 10 includes any of the eNB 30 and the RSU 50, for example. Such devices are collectively called a network device in contrast with the UE 10.

(1.1) Functions (a) Measurement

A case in which the UE 10 measures the location information will be described. For example, the UE 10 may measure the location information through GNSS positioning or assisted GPS (A-GNSS) positioning. In addition, the UE 10 may measure the location information using D2D aided positioning technology that measures location through D2D communication between terminals.

Next, a case in which the network device measures the location information of the UE 10 will be described. For example, the eNB 30 may measure the location information using observed time difference of arrival (OTDOA) technology, uplink time difference of arrival (UTDOA) or enhanced cell identification (E-CID) technology. Further, the RSU 50 may estimate the location information using D2D aided positioning technology. In addition, the network device may estimate the location information using terrestrial beacon systems (TBS) technology or positioning technology using Wi-Fi (registered trademark) or Bluetooth (registered trademark).

The location information may include altitude information. The altitude information may be measured by, for example, 3GPP indoor positioning technology.

(b) Determination

For example, the UE 10 previously acquires and stores map information. Then, the UE 10 determines whether to activate or deactivate V2P communication on the basis of a result of comparison of the location information thereof with the map information. For example, the UE 10 determines activation of V2P communication at a position at which a possibility of crash with the moving object 22 is high (e.g., the vicinity of a road) and determines deactivation of V2P communication at a position at which the possibility is low (e.g., inside of a building). Further, the UE 10 may determine that V2P communication is activated when the UE 10 is located within a predetermined distance from a road.

Additionally, the UE 10 may determine that V2P communication is activated when the UE 10 is located within the range of a specific area. Here, the specific area is an intersection at which the RSU 50 is not installed, for example. Considering characteristics of V2P communication, it is considered that V2P communication is not performed in an area in which there are many pedestrians, such as a scramble crossing in a downtown area. In such an area, therefore, it is considered that the RSU 50 on which an image sensor is mounted is installed to determine a possibility of accident and notify the neighboring UE 10 or the like of the possibility of accident. Accordingly, it is desirable that V2P communication of the UE 10 be deactivated in an area in which the RSU 50 is installed and V2P communication be activated in an area in which the RSU 50 is not installed.

Although a case in which the UE 10 is the determination subject has been described above, determination may be performed through the same method even when the determination subject is the network device.

(c) Control

The UE 10 controls activation processing or deactivation processing on the basis of the determination result. In the case of activation, the UE 10 acquires parameters related to V2P communication to be activated (referred to hereinafter as communication parameters). The UE 10 may obtain the communication parameters from the network device or previously store the communication parameters.

Communication Parameters Common in Transmission/Reception

For example, the communication parameters may include band information, multiplexing information and so on used for communication. The multiplexing information may include configuration information of time division duplex (TDD), for example. Further, the multiplexing information may include information for multiplexing of uplink and downlink or information for multiplexing of the Uu interface and the PC5 interface.

In addition, the communication parameters may include synchronization related information. The synchronization related information may include information that indicates frame timing or frequency information, acquired through the PC5 interface. Further, the synchronization related information may include timing offset information from universal time coordinated (UTC). Here, offset means a frame timing difference between the Uu interface and the PC interface.

Further, the communication parameters may include a GNSS function activation instruction.

Communication Parameters for Reception

For example, communication parameters may include information about resources monitored by the UE 10 for reception. Here, the resources may refer to both a control channel and a data channel. The information about resources may include information indicating a resource pool, information indicating a monitoring time window, information indicating a time resource pattern and so on, for example.

Communication Parameters for Transmission

For example, the UE 10 may include information about resources used for the UE 10 for transmission. Here, the resources may refer to both a control channel and a data channel. The information about resources may include information indicating a resource pool, information indicating a time resource pattern, transmission power information, modulation and coding scheme (MCS) information, information on the number of retransmissions, and so on, for example.

Examples of communication parameters have been described. The UE 10 activates V2P communication using the acquired communication parameters.

(1.2) Processing Flow

Variations of the aforementioned measurement, determination and control processing flows will be described with reference to FIGS. 12 to 17. FIGS. 12 to 17 are sequence diagrams illustrating examples of activation processing flow depending on location information. The network device (eNB 30 or RSU 50) and the UE 10 are involved in each sequence.

First Case (UE->UE->UE)

This case is a case in which the UE 10 performs all of measurement, determination and control. In this case, signaling of the UE 10 and other devices is not necessary. This case is employed when the network device is not present.

Second Case (UE->UE->Network Device)

This case is a case in which the UE 10 performs measurement and determination and the network device performs control. The sequence of this case is illustrated in FIG. 12. As illustrated in FIG. 12, first of all, the UE 10 performs measurement (step S101) and determination (step S102) and notifies the network device of information indicating the determination result (step S103). Subsequently, the network device performs control (step S104) and notifies the UE 10 of activation notification indicating activation and communication parameters (step S105).

Third Case (UE->Network Device->UE)

This case is a case in which the UE 10 performs measurement and control and the network device performs determination. In this case, the communication function is autonomous communication such as Mode 2 communication in D2D communication because the UE 10 performs control. The sequence of this case is illustrated in FIG. 13. As illustrated in FIG. 13, first of all, the UE 10 performs measurement (step S111) and notifies the network device of measured location information (step S112). Subsequently, the network device performs determination (step S113) and notifies the UE 10 of activation notification (step S114). Then, the UE 10 performs control in response to the activation notification (step S115).

Fourth Case (UE->Network Device->Network Device)

This case is a case in which the UE 10 performs measurement and the network device performs determination and control. The sequence of this case is illustrated in FIG.

14. As illustrated in FIG. 14, first of all, the UE 10 performs measurement (step S121) and notifies the network device of measured location information (step S122). Subsequently, the network device performs determination (step S123) and control (step S124) and notifies the UE 10 of activation notification and communication parameters (step S125).

Fifth Case (Network Device->UE->UE)

This case is a case in which the network device performs measurement and the UE 10 performs determination and control. The sequence of this case is illustrated in FIG. 15. As illustrated in FIG. 15, first of all, the network device performs measurement (S131) and notifies the UE 10 of measured location information (S132). Subsequently, the UE 10 performs determination (step S133) and control (step S134).

Sixth Case (Network Device->UE->Network Device)

This case is a case in which the network device performs measurement and control and the UE 10 performs determination. The sequence of this case is illustrated in FIG. 16. As illustrated in FIG. 16, first of all, the network device performs measurement (step S141) and notifies the UE 10 of measured location information (S142). Subsequently, the UE 10 performs determination (step S143) and notifies the network device of the determination result (step S144). Then, the network device performs control in response to the determination result (step S145) and notifies the UE 10 of activation notification and communication parameters (step S146).

Seventh Case (Network Device->Network Device->UE)

This case is a case in which the network device performs measurement and determination and the UE 10 performs control. In this case, the communication function is autonomous communication such as Mode 2 communication in D2D communication because the UE 10 performs control. The sequence of this case is illustrated in FIG. 17. As illustrated in FIG. 17, first of all, the network device performs measurement (step S151) and determination (step S152) and notifies the UE 10 of the determination result (step S153). Subsequently, the UE 10 performs control (step S154).

Eighth Case (Network Device->Network Device->Network Device)

This case is a case in which the network device performs measurement, determination and control. This case is a rare case.

(2) Activation Depending on Relative Relationship

The information acquired depending on position may be information that indicates a relative relationship with another device (e.g., the UE 20, the RSU 50 or the like). For example, the UE 10 measures a signal transmitted from the other device, determines to perform activation or deactivation on the basis of a relative relationship with the other device, which is indicated by the measurement result, and controls activation or deactivation processing. Such steps may be performed by the UE 10 or a network device other than the UE 10. In the following description, these steps are performed by the UE 10. The relative relationship includes a relative speed relationship in addition to a relative location relationship.

(2.1) Functions (a) Measurement

The UE 10 measures a signal transmitted from another device and estimates a relative relationship on the basis of the measurement result. For example, a measurement target may be power of a V2P communication band or power of a predetermined resource pool. Further, the measurement target may be a discovery signal. Moreover, the measurement target may be a sidelink synchronization signal or a sidelink broadcast signal. If the RSU 50 is of an eNB type, a downlink control signal transmitted from the RSU 50 may be the measurement target.

The UE 10 obtains parameters (referred to hereinafter as measurement parameters) for measuring the aforementioned measurement target as parameters for estimating the relative relationship. The UE 10 may acquire the measurement parameters from a network device or previously store the measurement parameters. For example, the measurement parameters may include band information that indicates a band for which monitoring is performed. Further, the measurement parameters may include synchronization information including frame timing, center frequency information and the like in the band for which monitoring is performed. The synchronization information may be acquired from the GNSS signal from the GNSS satellite 40. In addition, the measurement parameters may include measurement gap information including a measurement cycle, a measurement duration, resource pool information of the measurement target and so on. The UE 10 acquires one or more of the aforementioned band information, synchronization information and measurement gap information depending on the measurement target.

The UE 10 measures the measurement target using the acquired measurement parameters. Accordingly, the UE 10 may decrease power consumption by appropriately restricting a measured frequency and timing. Here, the UE 10 may change the measurement parameters depending on information of the UE 10. For example, the UE may change the measurement gap information, such as by increasing the measurement cycle and decreasing the measurement duration if the UE 10 is separated from a road, depending on location information thereof. In addition, the UE 10 may change the measurement parameters in response to the number of radio frequencies (RFs) (e.g., the number of RF circuits) or remaining battery capacity. According to such change, the UE may further decrease power consumption depending on a situation.

(b) Determination

The UE 10 determines whether to activate or deactivate V2P communication on the basis of the aforementioned measurement result. For example, the UE 10 estimates the relative relationship with the other device and performs determination on the basis of the estimated relative relationship.

For example, the information indicating the relative relationship may be information that indicates whether the received power of the signal transmitted from the UE 20 or the RSU 50 exceeds a threshold value. For example, the UE 10 may estimate the relative distance with the RSU 50 or the UE 20 on the basis of a received signal strength indicator (RSSI), reference signal received power (RSRP) and reference signal received quality (RSRQ) of the band to determine whether activation or deactivation of V2P communication is necessary.

For example, the information indicating the relative relationship may be information included in the signal transmitted from the UE 20 or the RSU 50. For example, the UE 10 may recognize presence of the RSU 50 on the basis of identification information (e.g., RSU ID) of a transmission source device included in a discovery signal or a broadcast signal to determine whether activation or deactivation of V2P communication is necessary. Further, the UE 10 may determine whether activation or deactivation of V2P communication is necessary on the basis of flag information included in the discovery signal or the broadcast signal that indicates whether V2P communication is necessary for the area.

The UE 10 may perform determination by appropriately combining the aforementioned information. In this case, the UE 10 may estimate the relative relationship in stages. For example, the UE 10 may decode the signal to acquire information included in the signal only when the received power exceeds the threshold value.

Subsequently, an example of detailed determination standard will be described.

For example, the UE 10 may activate V2P communication when it is estimated that the RSU 50 is present within a predetermined distance. According to this determination standard, accident occurrence in the vicinity of a road may be prevented using V2P communication.

On the other hand, the UE 10 may activate V2P communication when it is estimated that the RSI 50 is not present within the predetermined distance. According to this determination standard, self-protection in an area in which the RSU 50 is not present nearby becomes possible. As such an area, an area where there are many pedestrians, such as a scramble crossing of a downtown area, as described above, an intersection at which the RSU 50 is not installed or the like is considered.

(c) Control

The UE 10 controls activation processing or deactivation processing depending on the aforementioned determination result. In the case of activation, the UE 10 acquires communication parameters related to V2P communication to be activated. The UE 10 may acquire the communication parameters from a network device or previously store the communication parameters. The content of the communication parameters has been described above.

For example, when the communication parameters have been provided by the decoded signal in the aforementioned measurement, the UE 10 may use the communication parameters or newly acquire communication parameters to update the communication parameters.

Further, the UE 10 may inquire the communication parameters of the eNB 30 or the RSU 50. In case of the eNB 30, the inquiry may be a scheduling request.

In addition, the UE 10 may acquire the communication parameters from a signal broadcast from the eNB 30 or the RSU 50. For example, the eNB 30 or the RSU 50 may include the communication parameters in a discovery signal and transmit the discovery signal. Further, the RSU 50 may periodically regularly broadcast communication parameters which are used locally.

Here, the UE 10 may acquire the communication parameters in stages. For example, the UE 10 may previously initiate acquisition of the communication parameters at the stage of detecting weak power to prepare for activation of V2P communication. In addition, the UE 10 may acquire the communication parameters only when received power exceeds the threshold value.

The UE 10 activates V2P communication using the communication parameters acquired in this manner.

The UE 10 may acquire synchronization using the GNSS signal for V2P communication to be activated when V2P communication is started. In this case, the UE 10 acquires synchronization related information to activate the GNSS function.

The UE 10 may notify the eNB 30 or the RSU 50 that V2P communication has been activated. Accordingly, the UE 10 may be included in target IDs of downlink multicast communication from the eNB 30.

(2.2) Processing Flow

The aforementioned measurement, determination and control processing flows will be described with reference to FIGS. 18 to 20.

FIG. 18 is a sequence diagram illustrating an activation processing flow depending on a relative relationship. The UE 10, the vehicle 20 (i.e., UE 20) and the eNB 30 or the RSU 50 are involved in this sequence. As illustrated in FIG. 18, first of all, the eNB 30 or the RSU 50 notifies the UE 10 of measurement parameters (step S202). Subsequently, the UE 10 measures a discovery signal, a synchronization signal or a broadcast signal transmitted from the UE 20, the eNB 30 or the RSU 50 using the measurement parameters (step S204). Then, the UE 10 performs determination on the basis of the measurement result (step S206) and notifies the eNB 30 or the RSU 50 of the determination result (step S208). The eNB 30 or the RSU 50 notified of the determination result performs control on the basis of the determination result (step S210) and notifies the UE 10 of communication parameters (step S212). Then, the UE 10 activates V2P communication using the communication parameters to start V2P communication (step S216).

FIGS. 19 and 20 are flowcharts illustrating examples of stepwise communication parameter acquisition processing flow. This flow is performed by the UE 10.

As illustrated in FIG. 19, first of all, the UE 10 measures received power of a signal from another device (step S302) and determines whether the received power is equal to or higher than a threshold value (step S304). When it is determined that the received power is equal to or higher than the threshold value (step S304/YES), the UE 10 previously acquires communication parameters (step S306) and ends the processing. On the other hand, when it is determined that the received power is not equal to or higher than the threshold value (step S304/NO), the processing is immediately ended.

As illustrated in FIG. 20, first of all, the UE 10 measures received power of a signal from another device (step S402) and determines whether the received power is equal to or higher than a threshold value (step S404). When it is determined that the received power is equal to or higher than the threshold value (step S404/YES), the UE 10 acquires a decoding parameter for decoding the signal (step S406) and performs decoding (step S408). For example, communication parameters are acquired by decoding. Then, the UE 10 determines whether to activate V2P communication (step S410). When it is determined that V2P communication is activated (step S410/YES), the UE 10 controls activation processing of V2P communication to activate V2P communication (step S412) and ends the processing. On the other hand, when it is determined that the received power of the signal from the other device is not equal to or higher than the threshold value (step S404/NO) and it is determined that V2P communication is not activated (step S410/NO), the processing is immediately ended.

(3) Activation/Deactivation Depending on Getting in/Out of Moving Object

Information acquired depending on position may be information about getting in/out of a moving object that transports the UE 10 (referred to hereinafter as transportation information). For example, when the UE 10 detects that the user 12 gets into a moving object 22 such as a car, a bus, a taxi or a streetcar, that is, the user 12 is transported by the moving object 22, the UE 10 may deactivate V2P communication. Further, when the UE 10 detects that the user 12 gets out of the moving object 22, that is, the user 12 is not transported by the moving object 22, the UE 10 may activate V2P communication.

(a) Transportation Information Based on Wireless Communication

For example, information about whether the UE 10 is transported by the moving object, that is, transportation information, is acquired on the basis of received power of a signal received from the UE 10 or information included in the received signal. Acquisition of the transportation information may be performed by the UE 10 or a network device such as the eNB 30 or the RSU 50.

In addition, the transportation information may be acquired through a procedure of attaching to or detaching from a moving cell formed by the UE 20, for example. For example, when the attaching procedure is performed by the UE 10, transportation information indicating that the UE 10 is transported by the moving object is obtained. When the detaching procedure is performed by the UE 10, transportation information indicating that the UE 10 is not transported by the moving object is acquired.

(b) Transportation Information Based on Short Range Wireless Communication

For example, the transportation information may be acquired according to communication of the UE 10 with the moving object 22, more precisely, a short range wireless communication terminal installed in the moving object 22, that is, according to presence or absence of contact. Short range wireless communication schemes may include near field communication (NFC), Bluetooth, infrared data association (IrDA), ZigBee (registered trademark) and the like. Such a short range wireless communication terminal may include a bus boarding fare adjustment machine, a keyless entry system of a private car, or the like.

(c) Transportation Information Based on Tracking of Location Information.

For example, the transportation information may be acquired on the basis of a tracking result of the location information of the UE 10. At this time, whether the UE 10 is positioned on a road, a moving speed or the like may be referred to.

«4. Second Embodiment»

The present embodiment further decreases power consumption by controlling reception timing or transmission timing in a state in which the communication function of the UE 10 has been activated.

Specifically, the UE 10 performs intermittent communication with the UE 20 or the RSU 50. The transmitting side performs intermittent transmission using a discontinuous transmission (DTX) scheme. On the other hand, the receiving side performs intermittent reception using a discontinuous reception (DRX) scheme. Communication opportunities of the UE 10 decrease in both a case in which the UE 10 is the transmitting side and a case in which the UE 10 is the receiving side, and thus power consumption may be decreased.

Hereinafter, a case in which the UE 10 performs DRX as a receiving side will be described first and then a case in which the UE 10 performs DTX as a transmitting side will be described. In the following description, a target of intermittent communication of the UE 10 is the UE 20.

(1) DRX

Overview

FIG. 21 is an explanatory diagram for describing an example of transmission and reception processing of typical V2P communication. As illustrated in FIG. 21, moving objects (vehicle A and vehicle B) typically transmit default messages at periodic timings. A message for V2P communication is regarded as having a long transmission cycle (e.g., approximately 1 Hz), compared to V2V communication. In V2P communication, a base station that intensively controls fine transmission and reception timings is not present in many cases and thus autonomous distributed communication is performed. According to this circumstance, a pedestrian side (pedestrian A) constantly waits in a reception standby state to receive messages transmitted from moving object sides at respective timings of the moving object sides, as illustrated in FIG. 21.

In the present embodiment, the state of the receiving side intermittently becomes a reception standby state using the DRX scheme. The reception standby state is a state in which a signal is received. On the other hand, a state in which a signal is not received is called a reception sleep state. Of course, power consumption in the reception sleep state is lower than that in the reception standby state. A period in which the state of the receiving side intermittently becomes the reception standby state is called a DRX window hereinafter. The transmitting side transmits a message at the timing of the DRX window.

Specifically, the UE 10 performs intermittent communication (i.e., reception) with the UE 20 using the DRX scheme. Accordingly, the UE 20 performs communication (i.e., transmission) with the UE 10 according to timing at which intermittent communication of the UE 10 is possible using the DTX scheme. The UE 20 performs transmission at the timing at which the state of the UE 10 becomes the reception standby state and thus the reception standby state of the UE 10 may be shortened. Accordingly, power consumption of the UE 10 may be decreased.

(a) Parameter Setting

DRX Parameters

The UE 10 sets parameters (referred to hereinafter as DRX parameters) for performing intermittent reception using DRX.

For example, the DRX parameters may include a DRX cycle. For example, 1 cycle is designated by combining the duration of the DRX window and durations of other reception sleep states. Further, the DRX cycle may include a start timing of 1 cycle (e.g., a frame number or the like).

The DRX parameters may include an on duration. The on duration is information that indicates the length of the DRX window. Similarly, the DRX parameters may include an off duration that indicates the length of the duration of a reception sleep state.

The DRX parameters may include a DRX extension. The DRX extension may be an extension from a default DRX window and may be set to ±α, for example.

The DRX parameters may include a DRX resource pool. The DRX resource pool is information about a resource pool used for DRX communication.

The DRX parameters may include a DRX frequency. The DRX frequency is information regarding a frequency used for DRX. Accordingly, a measure such as performing DRX only at a specific frequency may be possible in the case of multicarrier V2P communication.

The DRX parameters may include a DRX group number. The DRX group number is identification information of a group of one or more terminals that perform DRX and identification information of a group to which the UE 10 belongs. The UE 10 may identify the group thereof using the DRX group number to use preset information corresponding thereto. The DRX group number may be set on the basis of terminal information. For example, the DRX group number may be radio network temporary identifier (RNTI) mod X, international mobile subscriber identity (IMS) mod X or UE category.

The DRX parameter may include parameters for irregular DRX for an event trigger message or the like. Such parameters include a start frame number, a start sub-frame number, an on duration and so on.

DRX Configuration

The UE 10 may acquire the DRX parameters from another device to set the DRX parameters. For example, the UE 10 may acquire DRX parameters provided by a system information block (SIB) as system information from the eNB 30.

The DRX parameters may be set for each of types of transmitted and received messages. Message types include a periodical message, an event trigger message and so on. For the event trigger message, the on duration may be set to be short and periodicity may be increased. In this case, low delay is achieved.

The DRX parameters may be common among a plurality of UEs 10 or may be different for each UE 10. For example, the DRX parameters may be set for each group (i.e., DRX group) to which the UE 10 belongs. For example, congestion on specific resources is prevented from when different DRX parameters are set for each DRX group.

The DRX parameters may be set depending on the location information of the UE 10. For example, the DRX parameters may be set according to whether the UE 10 is positioned within the coverage of a specific eNB 30 or RSU 50 or whether the UE 10 is positioned in a designated area. When the UE 10 is positioned outside the coverage of the eNB 30, the UE 10 may acquire the DRX parameters from previously stored preset information and thus may not set the DRX parameters. Further, the DRX parameters may be set depending on speed information of the UE 10.

Setting of Transmitting Side

The UE 20 transmits a message at least once in accordance with the DRX window of the receiving side. The transmission frequency of the UE 20 may not be consistent with the reception frequency of the UE 10. Specifically, the reception frequency may be lower than the transmission frequency. For example, the UE 20 may transmit a periodical message at a frequency of 10 Hz and the UE 10 may receive the periodical message at a frequency of 1 Hz. The UE 20 sets transmission parameters such that a message is transmitted within the DRX window of the UE 10 to maintain at least a required message frequency.

(b) Control

The UE 20 transmits a message according to the reception timing (i.e., DRX window) of the receiving side.

For such transmission timing control, three methods are considered. The first one is a method through which the eNB 30 accurately decides transmission resources. The second one is a method through which the eNB 30 decides a resource pool and a transmitting side selects transmission resources therefrom. The third one is a method through which the transmitting side selects transmission resources from a previously set resource pool. The UE 20 transmits a message using transmission resources specified by any of the aforementioned three methods.

As control methods for adjusting to the DRX window of the receiving side, addition of transmission timing, change of transmission timing and division of the number of repetitions are considered.

Addition of Transmission Timing

The UE 20 may add a transmission timing in response to the reception timing of the UE 10. For example, the UE 20 may additionally transmit a message in response to the reception timing of the UE 10 while maintaining normal periodic message transmission. The message transmitted at the additional timing is called an additional message hereinafter. The additional message may be retransmission of a default message. Detailed description will be given with reference to FIGS. 22 and 23.

FIG. 22 is an explanatory diagram for describing an example of transmission/reception processing of V2P communication, to which transmission timing is added. As illustrated in FIG. 22, a UE 20A (vehicle A) and a UE 20B (vehicle B) transmit default messages on the same cycle (10 frames (100 ms)) at different timings. The DRX window of the UE 10 (pedestrian A) is set to a cycle of one to 100 frames (1 s). Accordingly, the UE 20A and the UE 20B transmit additional messages at the timing of the DRX window of the UE 10.

FIG. 23 is an explanatory diagram for describing an example of transmission/reception processing of V2P communication, to which transmission timing is added.

As illustrated in FIG. 22, the UE 20A (vehicle A) and the UE 20B (vehicle B) transmit default messages on the same cycle (10 frames (100 ms)) at different timings. The DRX window of the UE 10 (pedestrian A) is set to a cycle of one to 20 frames. Accordingly, the UE 20A and the UE 20B transmit additional messages at different timings, at the timing of the DRX window of the UE 10.

The UE 20 may acquire transmission resource information for the aforementioned additional message from a network device such as the eNB 30 or the RSU 50. The acquired transmission resource information may be accurately decided transmission resource information or resource pool information with a wide choice. Either way, the UE 20 obtains time resources and frequency resources for the additional message. Further, the UE 20 may acquire information about the DRX window of the UE 10.

The UE 20 may acquire the transmission resource information for the additional message for itself. For example, the UE 20 may acquire the transmission resource information for the additional message on the basis of location information of the UE 10 or the UE 20. Further, the UE 20 may use resources confirmed as being blank through carrier sensing as transmission resources for the additional message. In addition, the UE 20 may acquire the transmission resource information for the additional message from preset information.

The UE 20 transmits the additional message according to the transmission resource information acquired in this manner. The transmission resources for the additional message are called additional resources hereinafter.

For example, the UE 20 may repeatedly transmit the same message multiple times in the additional resources. Further, the UE 20 may transmit the additional message at a lower code rate than the default message. In addition, the UE 20 may transmit the additional message with higher transmission power than the default message. According to such control, an error rate at the receiving side may be improved.

Here, it is desirable that the UE 20 notify (e.g., the UE 10) of information about the added transmission timing on sidelink. For this reason, it is desirable to add a new parameter to an existing control signal (physical sidelink control channel (PSCCH)) transmitted on sidelink or to designate a new control signal. Parameters to be designated for such a control signal include information indicating the number of repetitions of transmission of the same message, information on a redundancy version in repetitive transmission, MCS information and transmission power information.

Change of Transmission Timing

The UE 20 may change existing transmission timing depending on the reception timing of the UE 10. For example, the UE 20 may change part of timings of normal periodic message transmissions in response to the reception timing of the UE 10. A message transmitted at the changed timing is referred to as a changed message hereinafter. Detailed description will be given with reference to FIGS. 24 and 25.

FIG. 24 is an explanatory diagram for describing an example of transmission/reception processing of V2P communication, transmission timing of which is changed. As illustrated in FIG. 24, the UE 20A (vehicle A) and the UE 20B (vehicle B) transmit default messages on the same cycle (10 frames (100 ms)) at different timings. The DRX window of the UE 10 (pedestrian A) is set to a cycle of one to 20 frames. Accordingly, the UE 20A and the UE 20B transmit changed messages by shifting parts of their default message transmission timings to be consistent with the timing of the DRX window of the UE 10.

FIG. 25 is an explanatory diagram for describing an example of transmission/reception processing of V2P communication, transmission timing of which is changed. As illustrated in FIG. 25, the UE 20A (vehicle A) and the UE 20B (vehicle B) transmit default messages on the same cycle (10 frames (100 ms)) at different timings. DRX windows of a UE 10A (pedestrian A) and a UE 10B (pedestrian B) are set to a cycle of one to 20 frames. Accordingly, the UE 20A and the UE 20B transmit changed messages by shifting parts of their default message transmission timings to be consistent with the timing of the DRX window of the UE 10A or UE B.

Here, it is desirable that the UE 20 notify (e.g., the UE 10) of information about changed transmission timing on sidelink in order to change the existing default message transmission timing. Accordingly, the control signal may be changed or newly designated, for example. Parameters to designate for such a control signal include a frame number of a frame in which transmission timing is changed, an offset value indicating a time-direction shift, an offset value indicating a frequency-direction shift, etc. The offset value indicating a time-direction shift may be an offset value based on the start point of a frame or a sub-frame. The offset value indicating a frequency-direction shift may be an offset value based on the center frequency. In addition, the parameters to designate include information indicating the number of repetitions of transmission of the same message, information on an RV in repetitive transmission, MCS information and transmission power information, for example.

Division of Number of Repetitions

The UE 20 may perform at least part of repetitive transmissions of the same message, performed at the existing transmission timing, at a transmission timing added in response to the reception timing of the UE 10. For example, the UE 20 decreases the number of repetitions of transmission of the same default message, performed in a frame to which DRX is allocated, and performs the reduced number of repetitive transmissions at the added transmission timing. Typically, the transmitting side repetitively transmits the same default message multiple times in V2X communication. The present control method is to divide the number of repetitions of transmission, to perform part of repetitive transmission at the existing transmission timing and to move a different part thereof to the added transmission timing.

Here, to change the number of repetitions of transmission of the same default message at the existing transmission timing, it is desirable that the UE 20 notify (e.g., the UE 10) of information about change of the number of repetitions on sidelink. Accordingly, the control signal may be changed or newly designated, for example. Parameters to be designated for such a control signal include an index of division of the number of repetitions, information about update of the number of repetitions, RV information and the like. The index of division of the number of repetitions is information indicating whether the number of transmissions is divided. The information about update of the number of repetitions is information indicating the number of reduction of repetitive transmissions at the existing transmission timing. Further, it is desirable that the aforementioned information about the added transmission timing be included in the control signal.

(c) Processing Flow

FIG. 26 is a sequence diagram illustrating an example of a message transmission/reception processing flow using DRX. The UE 10, the vehicle 20 (i.e., UE 20) and the eNB 30 or the RSU 50 are involved in this sequence. As illustrated in FIG. 26, first of all, the eNB 30 or the RSU 50 transmits DRX parameters to the UE 10 (step S502). Subsequently, the UE 10 sets the state of the received DRX parameters to intermittently become the reception standby state (step S504). The eNB 30 or the RSU 50 transmits transmission resource information indicating transmission resources depending on the DRX window to the UE 20 (step S506). Then, the UE 20 sets a transmission timing based on the transmission resource information (step S508) and includes information about the set transmission timing in a control signal to notify, for example, the UE 10 of the set transmission timing (step S510). The control signal includes information about added or changed transmission timing or information about a change in the number of repetition of transmission. Subsequently, the UE 20 transmits a message at the timing in response to the DRX window on the basis of the transmission resource information (step S512) and the UE 10 receives the message in the DRX window (step S514).

(2) DTX

In the present embodiment, the state of the transmitting side intermittently becomes a transmission state using the DTX scheme. The transmission state is a state in which a signal is transmitted. On the other hand, a state in which a signal is not transmitted is called a transmission stop state. Of course, power consumption in the transmission stop state is lower than that in the transmission state. A period in which the state of the transmitting side intermittently becomes the transmission state is called a DTX window hereinafter. The receiving side receives a message at the timing of the DTX window.

Specifically, the UE 10 performs intermittent communication (i.e., transmission) with the UE 20 using the DTX scheme. Accordingly, the UE 20 performs communication (i.e., reception) with the UE 10 in response to the timing at which intermittent communication of the UE 10 becomes possible. The UE 20 may use the DRX scheme or may constantly wait in the reception standby state.

Here, considering that a transmitted message is, typically, a periodical message which is periodically transmitted, it is desirable that the DTX window be periodically allocated. An event trigger message is an irregular case and thus is not assigned a DTX window and may be transmitted without particular restrictions.

(a) Parameter Setting

The UE 10 sets parameters for performing intermittent transmission using DTX (referred to hereinafter as DTX parameters).

DTX Parameters

The DTX parameters may include a DTX cycle, for example. For example, 1 cycle is designated by a combination of the duration of the DTX window and the duration of another transmission stop state. Further, the DTX cycle may include a start timing (e.g., a frame number or the like) of 1 cycle.

The DTX parameters may include an on duration. The on duration is information indicating the length of the DTX window. Similarly, the DTX parameters may include an off duration that indicates the length of the duration of the transmission stop state.

The DTX parameters may include a DTX extension. The DTX extension may be an extension from a default DTX window and may be set to ±α, for example.

The DTX parameters may include a DTX resource pool. The DTX resource pool is information about a resource pool used for DTX communication.

The DTX parameters may include a DTX frequency. The DTX frequency is information about a frequency used for DTX. According to this, a measure such as performing DTX only at a specific frequency may be performed in the case of multicarrier V2P communication.

The DTX parameters may include a DTX group number. The DTX group number is identification information of a group of one or more terminals that perform DTX and identification information of a group to which the UE 10 belongs. The UE 10 may identify the group thereof using the DTX group number to use preset information corresponding thereto. The DTX number may be set on the basis of terminal information. For example, the DTX group number may be RNTI mod X, IMSI mod X or a UE category.

The DTX parameters may include parameters for irregular DTX for an event trigger message and the like. Such parameters include a start frame number, a start sub-frame number, an on duration and so on.

DTX Configuration

The UE 10 may acquire the DTX parameter from other devices. For example, the UE 10 may obtain DTX parameters provided by an SIB as system information from the eNB 30.

The DTX parameters may be set for each of types of transmitted and received messages. Message types include a periodical message, an event trigger message and so on. For the event trigger message, the on duration may be set to be short and periodicity may be increased. In this case, low delay is achieved.

The DTX parameters may be common among a plurality of UEs 10 or may be different for each UE 10. For example, the DTX parameters may be set for each group (i.e., DRX group) to which the UE 10 belongs. For example, congestion on specific resources is prevented when different DTX parameters are set for each DRX group.

The DTX parameters may be set depending on location information of the UE 10.

For example, the DTX parameters may be set depending on whether the UE 10 is located within the coverage of a specific eNB 30 or RSU 50 or whether the UE 10 is located in a designated area. When the UE 10 is located within the coverage of the eNB 30, the UE 10 may acquire the DTX parameters from previously stored preset information and thus may not set the DTX parameters. Further, the DTX parameters may be set depending on speed information of the UE 10. In addition, the DTX parameters may be set depending on speed information of the UE 10. Further, the UE 10 may use resources confirmed as being blank through carrier sensing as transmission resources for DTX.

Preset Information for DTX Parameters

The UE 10 may notify another device that controls the DTX parameters (e.g., UE 20, eNB 30 or RSU 50) of information for generating DTX parameters. Such information is referred to hereinafter as preset information.

For example, the preset information may include information of the UE 10 for DTX group formation. Specifically, the preset information may include a buffer status report (BSR) related to V2X communication. Further, the preset information may include a periodical BSR that indicates buffer capacity of the periodical message. The preset information may include information unique to the UE 10, such as RNTI, IMSI or a UE category. In addition, the preset information may include a DTX extension request that requests a temporary increase in DTX opportunities (DTX window size, frequency or the like). Accordingly, it may be possible to cope with a temporary message size increase.

The eNB 30 or the like may allocate the DTX parameters to each UE 10 on the basis of such preset information.

(b) Processing Flow

FIG. 27 is a sequence diagram illustrating a message transmission/reception processing flow using DTX. The UE 10, the vehicle 20 (i.e., UE 20) and the eNB 30 or the RSU 50 are involved in this sequence. As illustrated in FIG. 27, first of all, the UE 10 transmits preset information for DTX parameters to the eNB 30 or the RSU 50 (step S602). Subsequently, the eNB 30 or the RSU 50 that has received the preset information generates the DTX parameters on the basis of the preset information (step S604) and notifies the UE 10 of the generated DTX parameters (step S606). Thereafter, the UE 10 sets the received DTX parameters (step S608) and intermittently transmits a message (step S610). Then, the UE 20, the eNB 30 or the RSU 50 receives the message (step S612).

«5. Application Examples»

The technology of the present disclosure is applicable to various products. For example, the eNB 30 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the eNB may be realized as any other types of base stations such as a NodeB and a base transceiver station (BTS). The eNB may include a main body (that is also referred to as a base station device) configured to control wireless communication, and one or more remote radio heads (RRH) disposed in a different place from the main body. Additionally, various types of terminals to be discussed later may also operate as the eNB by temporarily or semi-permanently executing a base station function. Furthermore, at least part of components of the eNB 30 may be realized in a base station device or a module for the base station device.

For example, the UEs 10 and 20, or the RUS 50 may be realized as a mobile terminal such as a smartphone, a tablet personal computer (PC), a notebook PC, a portable game terminal, a portable/dongle type mobile router, and a digital camera, or an in-vehicle terminal such as a car navigation device. The UEs 10 and 20, or the RUS 50 may also be realized as a terminal (that is also referred to as a machine type communication (MTC) terminal) that performs machine-to-machine (M2M) communication. Furthermore, the at least some of these structural elements of the UEs 10 and 20, or the RUS 50 may be realized in a module (such as an integrated circuit module including a single die) mounted on each of the terminals.

<5-1. Application Examples Regarding eNB>

(First Application Example)

FIG. 28 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 28. For example, the multiple antennas 810 may be compatible with multiple frequency bands used by the eNB 800. Although FIG. 28 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 28. For example, the multiple BB processors 826 may be compatible with multiple frequency bands used by the eNB 800. The wireless communication interface 825 may include the multiple RF circuits 827, as illustrated in FIG. 28. For example, the multiple RF circuits 827 may be compatible with multiple antenna elements. Although FIG. 28 illustrates the example in which the wireless communication interface 825 includes the multiple BB processors 826 and the multiple RF circuits 827, the wireless communication interface 825 may also include a single BB processor 826 or a single RF circuit 827.

In the eNB 800 illustrated in FIG. 28, the processing unit 350 described with reference to FIG. 10 may be mounted in the wireless communication interface 825 (e.g., BB processor 826) or controller 821. Furthermore, the wireless communication unit 320 may be mounted in the wireless communication interface 825 (e.g., RF circuit 827). The antenna part 310 may be mounted in the antenna 810. The network communication unit 330 may be mounted in the controller 821 and/or the network interface 823. In addition, the storage unit 340 may be mounted in the memory 822.

(Second Application Example)

FIG. 29 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 29. For example, the multiple antennas 840 may be compatible with multiple frequency bands used by the eNB 830. Although FIG. 29 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 28.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 28, except the BB processor 856 is connected to the RF circuit 864 of the RRH 860 via the connection interface 857. The wireless communication interface 855 may include the multiple BB processors 856, as illustrated in FIG. 29. For example, the multiple BB processors 856 may be compatible with multiple frequency bands used by the eNB 830. Although FIG. 29 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 29. For example, the multiple RF circuits 864 may support multiple antenna elements. Although FIG. 29 illustrates the example in which the wireless communication interface 863 includes the multiple RF circuits 864, the wireless communication interface 863 may also include a single RF circuit 864.

The eNB 830 illustrated in FIG. 29, the processing unit 350 described with reference to FIG. 10 may be mounted in the wireless communication interface 855, a wireless communication interface 863 and/or the controller 851. Furthermore, the wireless communication unit 320 may be mounted in the wireless communication interface 863 (e.g., RF circuit 864). The antenna part 310 may be mounted in the antenna 840. The network communication unit 330 may be mounted in the controller 851 and/or the network interface 853. In addition, the storage unit 340 may be mounted in the memory 852.

<5-2. Application Examples Regarding UE and RSU>
(First Application Example)

FIG. 30 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 30. Although FIG. 30 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 30. Although FIG. 30 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 30 via feeder lines, which are partially shown as dashed lines in the figure. The auxiliary controller 919 operates a minimum necessary function of the smartphone 900, for example, in a sleep mode.

In the smartphone 900 illustrated in FIG. 30, the processing unit 150 described with reference to FIG. 8, the processing unit 250 described with reference to FIG. 9 or the processing unit 540 described with reference to FIG. 11 may be mounted in the wireless communication interface 912 or the processor 901. Furthermore, the wireless communication unit 120, the wireless communication unit 220 or the wireless communication unit 520 may be mounted in the wireless communication interface 912 (e.g., RF circuit 914). The GNSS signal processing unit 130 or the GNSS signal processing unit 230 may be mounted in the sensor 907. The antenna part 110, the antenna part 210 or the antenna part 510 may be mounted in the antenna 916. In addition, the storage unit 140, the storage unit 240 or the storage unit 530 may be mounted in the memory 902.

(Second Application Example)

FIG. 31 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 31. Although FIG. 31 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a radio LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 31. Although FIG. 31 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 31 via feeder lines that are partially shown as dashed lines in the figure. The battery 938 accumulates power supplied form the vehicle.

In the car navigation device 920 illustrated in FIG. 31, the processing unit 150 described with reference to FIG. 8, the processing unit 250 described with reference to FIG. 9 or the processing unit 540 described with reference to FIG. 11 may be mounted in the wireless communication interface 933 or the processor 921. Furthermore, the wireless communication unit 120, the wireless communication unit 220 or the wireless communication unit 520 may be mounted in the wireless communication interface 933 (e.g., RF circuit 935). The GNSS signal processing unit 130 or the GNSS signal processing unit 230 may be mounted in the GPS module 924. The antenna part 110, the antenna part 210 or the antenna part 510 may be mounted in the antenna 937. In addition, the storage unit 140, the storage unit 240 or the storage unit 530 may be mounted in the memory 922.

The technology of the present disclosure may also be realized as an in-vehicle system (or a vehicle) 940 including one or more blocks of the car navigation device 920, the in-vehicle network 941, and a vehicle module 942. That is, the in-vehicle system (or a vehicle) 940 may be provided as the device including the processing unit 250 described with reference to FIG. 9. The vehicle module 942 generates vehicle data such as vehicle speed, engine speed, and trouble information, and outputs the generated data to the in-vehicle network 941.

«8. Conclusion»

An embodiment of the present disclosure has been described in detail with reference to FIGS. 1 to 31.

According to the first embodiment, the UE 10 performs communication with the moving object (i.e., UE 20), the RSU 50 or the eNB 30 and activates or deactivates the communication function on the basis of information acquired depending on position. Accordingly, a period in which the communication function is activated may be minimized and thus power consumption may be reduced.

According to the second embodiment, the UE 10 performs communication with the moving object (i.e., UE 20), the RSU 50 or the eNB 30 and sets parameters for intermittent communication with the UE 20 or the RSU 50. The UE 10 may further reduce power consumption in a state in which the communication function is activated by intermittently performing communication.

It should be understood by those skilled in the art that various modifications, combinations, sub-combinations and alterations may occur depending on design requirements and other factors insofar as they are within the scope of the appended claims or the equivalents thereof.

Processes described using flowcharts and sequence diagrams in the specification may not necessarily be performed in the illustrated orders. Some processing steps may be executed in parallel. Further, additional processing steps may be employed and some processing steps may be omitted.

In addition, a computer program for causing a processor (e.g., CPU, DSP or the like) included in a device (e.g., UE 10, UE 20, eNB 30 or RSU 50, or a module for such devices) of the specification to function as a component (e.g., processing unit 150, processing unit 250, processing unit 350, processing unit 540 or the like) of the device (in other words, a computer program for causing the processor to execute operations of a component of the device) may also be generated. Further, a recording medium in which the computer program is recorded may be provided. Moreover, a device including a memory that stores the computer program and one or more processors that can execute the computer program (e.g., a base station, a base station device or a module for the base station device, or a terminal device or a module for the terminal device) may also be provided. In addition, a method including operations of components of the device is included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An electronic device including: circuitry configured to perform wireless communication in accordance with vehicle-to-X (V2X) communication, the V2X communication including at least vehicle-to-vehicle (V2V) communication, vehicle-to-infrastructure (V2I) communication, or vehicle-to-pedestrian (V2P) communication, each of the V2V, V2I and V2P communications having an intermittent communication function; receive a signal associated with a location of the electronic device; determine whether to activate or deactivate a communication parameter corresponding to the V2P communication based on the signal associated with the location of the electronic device; activate or deactivate the communication parameter corresponding to the V2P communication based on the determining; and activate the intermittent communication function for the V2P communication in a case that that the parameter corresponding to the V2P communication is activated.

(2) The electronic device of (1), wherein the circuitry is configured to perform V2P communication with a vehicle mounted terminal device based on the activated or deactivated communication parameter.

(3) The electronic device of any of (1) to (2), wherein the V2P communication parameter corresponds to performing direct device-to-device (D2D) communications with a vehicle-mounted terminal device.

(4) The electronic device of any of (1) to (2), wherein the V2P communication parameter corresponds to performing communications with vehicle-mounted terminal device via a base station.

(5) The electronic device of any of (1) to (4), wherein the signal is a global navigation satellite system (GNSS) signal received from a GNSS satellite, and the circuitry is configured to determine the location of the electronic device based on the GNSS signal; and determine whether to activate of deactivate the communication parameter corresponding to the V2P communication based on the determined location of the electronic device.

(6) The electronic device of any of (1) to (4), wherein the signal is device-to-device (D2D) signal received from another electronic device, and the circuitry is configured to determine the location of the electronic device based on the D2D signal; and determine whether to activate of deactivate the communication parameter corresponding to V2P communication based on the determined location of the electronic device.

(7) The electronic device of any of (1) to (4), wherein the signal is received from a network device, and the circuitry is configured to determine whether to activate or deactivate the communication parameter corresponding to the V2P communication based on the signal received from the network device.

(8) The electronic device of any of (1) to (7), wherein the circuitry is configured to: store map information; and determine whether to activate or deactivate the communication parameter corresponding to the V2P communication based the stored map information and the location of the electronic device.

(9) The electronic device of any of (1) to (8), wherein the circuitry is configured to: determine whether the electronic device is within a predetermined range of a road side unit (RSU) based on the signal; and determine whether to activate of deactivate the communication parameter corresponding to the V2P communication based on determining whether the electronic device is within the predetermined range of the RSU.

(10) The electronic device of (9), wherein the circuitry is configured to deactivate the parameter corresponding to V2P communication when it is determined that the electronic device is within the predetermined range of the RSU.

(11) The electronic device of any of (9) to (10), wherein the circuitry is configured to activate the parameter corresponding to V2P communication when it is determined that the electronic device is outside the predetermined range of the RSU.

(12) The electronic device of any of (1) to (11), wherein the parameter corresponding to V2P communication includes at least one of a parameter related to a communication band, a parameter related to multiplexing, a parameter related to synchronization, a parameter related to a global navigation satellite system (GNSS) function, a parameter related to resources used for signal reception and a parameter related to resources used for signal transmission.

(13) The electronic device of any of (1) to (12), wherein the circuitry is configured to: determine the location of the electronic device based on the signal; and determine whether to activate or deactivate the communication parameter corresponding to the V2P communication based on the determined location of the location of the electronic device.

(14) The electronic device of any of (1) to (13), wherein the circuitry is configured to: perform measurement of a further signal received at the electronic device from another electronic device, a base station or a road side unit (RSU); transmit information corresponding to the measurement to a network device; and receive the signal indicative of the location of the electronic device in response to the transmitted information corresponding to the measurement.

(15) The electronic device of any of (1) to (13), wherein the circuitry is configured to: determine the location of the electronic device based on the signal; transmit information corresponding to the determined location to a network device; and receive a notification whether to activate or deactivate the communication parameter corresponding to the V2P communication based on the transmitted information corresponding to the determined location from the network device.

(16) The electronic device of any of (1) to (13), wherein the signal is received from a network device and includes information indicating the location of the electronic device as determined by the network device; and the circuitry is configured to determine whether to activate or deactivate the communication parameter corresponding to the V2P communication based on the information indicating the location of the electronic device as determined by the network device.

(17) The electronic device of any of (1) to (13), wherein the signal instructs the electronic device to activate or deactivate the communication parameter corresponding to the V2P communication.

(18) The electronic device of any of (1) to (13), wherein the signal is transmitted from another device within a wireless network and is indicative of the location of the electronic device in relation to at least the another device.

(19) The electronic device of any of (1) to (13), wherein the circuitry is configured to: perform a measurement on the signal; determine, as the location of the electronic device, a relative position of the electronic device in relation to a device that transmitted the signal; and determine whether to activate or deactivate the communication parameter corresponding to the V2P communication based on the relative position of the electronic device in relation to the device that transmitted the signal.

(20) The electronic device of any of (1) to (19), wherein the circuitry is configured to: determine, based on the signal, whether the electronic device is inside or outside a movable object; and determine whether to activate or deactivate the communication parameter corresponding to the V2P communication based on determining whether the electronic device is inside or outside the movable object.

(21) The electronic device of (20), wherein the signal is received from a vehicle-mounted terminal and the vehicle is the movable object; and the circuitry is configured to determine that the electronic device is inside or outside the vehicle based on a characteristic of the signal received from the vehicle-mounted terminal; activate the communication parameter corresponding to the V2P communication when it is determined that the electronic device is outside the vehicle; and deactivate the communication parameter corresponding to the V2P communication when it is determined that the electronic device is inside the vehicle.

(22) The electronic device of (21), wherein the characteristic of the signal received from the vehicle-mounted terminal corresponds to whether the signal is associated with an attachment to or detachment from a moving cell formed by the vehicle-mounted terminal.

(23) The electronic device of any of (1) to (22), wherein the circuitry is configured to: determine a moving speed of the electronic device; activate the communication parameter corresponding to the V2P communication when it is determined that the moving speed of the electronic device is less than a predetermined threshold; and deactivate the communication parameter corresponding to the V2P communication when it is determined that the moving speed of the electronic device is greater than the predetermined threshold.

(24) A wireless terminal configured for operation in a wireless network, the wireless terminal including: circuitry configured to receive a signal from a device operating in the wireless network; determine a position of the wireless terminal in relation to a vehicle-mounted wireless communication device based on the signal; determine to activate a communication parameter corresponding to vehicle-to-pedestrian (V2P) communication when the determined relative position indicates that the wireless terminal is within a predetermined range of the vehicle-mounted wireless communication device; and determine to deactivate a communication parameter corresponding to vehicle-to-pedestrian (V2P) communication when the determined relative position indicates that the wireless terminal is outside a predetermined range of the vehicle-mounted wireless communication device.

(25) The wireless terminal of (24), wherein the device operating in the wireless network is the vehicle-mounted wireless terminal.

(26) A method performed by an electronic device, the method including: performing wireless communication in accordance with vehicle-to-X (V2X) communication, the V2X communication including at least vehicle-to-vehicle (V2V) communication, vehicle-to-infrastructure (V2I) communication, or vehicle-to-pedestrian (V2P) communication, each of the V2V, V2I and V2P communications having an intermittent communication function; receiving a signal associated with a location of the electronic device; determining whether to activate or deactivate a communication parameter corresponding to the V2P communication based on the signal associated with the location of the electronic device; activating or deactivating the communication parameter corresponding to the V2P communication based on the determining; and activating the intermittent communication function for the V2P communication in a case that that the parameter corresponding to the V2P communication is activated.

REFERENCE SIGNS LIST

10 UE
12 user
20 UE
22 moving object 30 eNB
40 GNSS satellite
50 RSU
110 antenna part
120 wireless communication unit
130 GNSS signal processing unit
140 storage unit
150 processing unit
210 antenna part
220 wireless communication unit
230 GNSS signal processing unit
240 storage unit
250 processing unit
310 antenna part
320 wireless communication unit
330 network communication unit
340 storage unit
350 processing unit
510 antenna part
520 wireless communication unit
530 storage unit
540 processing unit

The invention claimed is:

1. An electronic device comprising
circuitry configured to
perform wireless communication in accordance with vehicle-to-everything (V2X) communication, the V2X communication including at least vehicle-to-vehicle (V2V) communication, vehicle-to-infrastructure (V2I) communication, or vehicle-to-pedestrian (V2P) communication, each of the V2V, V2I and V2P communications having a communication function;
receive a signal associated with a location of the electronic device;
determine whether the electronic device is within a predetermined range of a road side unit (RSU) based on the signal;
determine whether to activate or deactivate a communication parameter corresponding to the V2P communication based on the determination of whether the electronic device is within the predetermined range of the RSU;
activate or deactivate the communication parameter corresponding to the V2P communication based on the determination; and
activate the communication function for the V2P communication in a case that the communication parameter corresponding to the V2P communication is activated, wherein
the communication parameter corresponding to the V2P communication corresponds to performing direct device-to-device (D2D) communications with a vehicle-mounted terminal device.

2. The electronic device of claim 1, wherein
the circuitry is configured to perform the V2P communication with the vehicle-mounted terminal device based on the activated or deactivated communication parameter.

3. The electronic device of claim 1, wherein
the signal is a global navigation satellite system (GNSS) signal received from a GNSS satellite, and
the circuitry is configured to
determine the location of the electronic device based on the GNSS signal; and
determine whether to activate of deactivate the communication parameter corresponding to the V2P communication based on the determined location of the electronic device.

4. The electronic device of claim 1, wherein
the signal is a D2D signal received from another electronic device, and
the circuitry is configured to
determine the location of the electronic device based on the D2D signal; and
determine whether to activate of deactivate the communication parameter corresponding to the V2P communication based on the determined location of the electronic device.

5. The electronic device of claim 1, wherein
the signal is received from a network device, and
the circuitry is configured to determine whether to activate or deactivate the communication parameter corresponding to the V2P communication based on the signal received from the network device.

6. The electronic device of claim 1, wherein the circuitry is configured to:
store map information; and
determine whether to activate or deactivate the communication parameter corresponding to the V2P communication based the stored map information and the location of the electronic device.

7. The electronic device of claim 1 wherein
the circuitry is configured to deactivate the parameter corresponding to the V2P communication when the electronic device is determined to be within the predetermined range of the RSU.

8. The electronic device of claim 1, wherein
the circuitry is configured to activate the parameter corresponding to the V2P communication when the electronic device is determined to be outside the predetermined range of the RSU.

9. The electronic device of claim 1, wherein
the communication parameter corresponding to the V2P communication includes at least one of a parameter related to a communication band, a parameter related to multiplexing, a parameter related to synchronization a parameter related to a global navigation satellite system (GNSS) function, a parameter related to resources used for signal reception and a parameter related to resources used for signal transmission.

10. The electronic device of claim 1, wherein the circuitry is configured to:
determine the location of the electronic device based on the signal; and
determine whether to activate or deactivate the communication parameter corresponding to the V2P communication based on the determined location of the location of the electronic device.

11. The electronic device of claim 1, wherein the circuitry is configured to:
perform measurement of a further signal received at the electronic device from another electronic device, a base station or a road side unit (RSU);
transmit information corresponding to the measurement to a network device; and
receive the signal indicative of the location of the electronic device in response to the transmitted information corresponding to the measurement.

12. The electronic device of claim 1, wherein the circuitry is configured to:

determine the location of the electronic device based on the signal;
transmit information corresponding to the determined location to a network device; and
receive a notification whether to activate or deactivate the communication parameter corresponding to the V2P communication based on the transmitted information corresponding to the determined location from the network device.

13. The electronic device of claim 1, wherein
the signal is received from a network device and includes information indicating the location of the electronic device as determined by the network device; and
the circuitry is configured to determine whether to activate or deactivate the communication parameter corresponding to the V2P communication based on the information indicating the location of the electronic device as determined by the network device.

14. The electronic device of claim 1, wherein
the signal instructs the electronic device to activate or deactivate the communication parameter corresponding to the V2P communication.

15. The electronic device of claim 1, wherein
the signal is transmitted from another device within a wireless network and is indicative of the location of the electronic device in relation to at least the another device.

16. The electronic device of claim 1, wherein the circuitry is configured to:
perform a measurement on the signal;
determine, as the location of the electronic device, a relative position of the electronic device in relation to a device that transmitted the signal; and
determine whether to activate or deactivate the communication parameter corresponding to the V2P communication based on the relative position of the electronic device in relation to the device that transmitted the signal.

17. The electronic device of claim 1, wherein the circuitry is configured to:
determine, based on the signal, whether the electronic device is inside or outside a movable object; and
determine whether to activate or deactivate the communication parameter corresponding to the V2P communication based on the determination of whether the electronic device is inside or outside the movable object.

18. The electronic device of claim 17, wherein
the signal is received from the vehicle-mounted terminal and the vehicle is the movable object; and
the circuitry is configured to
determine that the electronic device is inside or outside the vehicle based on a characteristic of the signal received from the vehicle-mounted terminal;
activate the communication parameter corresponding to the V2P communication when the electronic device is determined to be outside the vehicle; and
deactivate the communication parameter corresponding to the V2P communication when the electronic device is determined to be inside the vehicle.

19. The electronic device of claim 18, wherein
the characteristic of the signal received from the vehicle-mounted terminal corresponds to whether the signal is associated with an attachment to or detachment from a moving cell formed by the vehicle-mounted terminal.

20. The electronic device of claim 1, wherein the circuitry is configured to:
determine a moving speed of the electronic device;
activate the communication parameter corresponding to the V2P communication when the moving speed of the electronic device is determined to be less than a predetermined threshold: and
deactivate the communication parameter corresponding to the V2P communication when the moving speed of the electronic device is determined to be greater than the predetermined threshold.

21. A method performed by an electronic device, the method comprising:
performing wireless communication in accordance with vehicle-to-everything (V2X) communication, the V2X communication including at least vehicle-to-vehicle (V2V) communication, vehicle-to-infrastructure (V2I) communication, or vehicle-to-pedestrian (V2P) communication, each of the V2V, V2I and V2P communications having a communication function;
receiving a signal associated with a location of the electronic device;
determining whether the electronic device is within a predetermined range of a road side unit (RSU) based on the signal;
determining whether to activate or deactivate a communication parameter corresponding to the V2P communication based on the determination of whether the electronic device is within the predetermined range of the RSU;
activating or deactivating the communication parameter corresponding to the V2P communication based on the determining; and
activating the communication function for the V2P communication in a case that that the communication parameter corresponding to the V2P communication is activated, wherein
the communication parameter corresponding to the V2P communication corresponds to performing direct device-to-device (D2D) communications with a vehicle-mounted terminal device.

* * * * *